US010297066B2

(12) United States Patent
Brewster

(10) Patent No.: US 10,297,066 B2
(45) Date of Patent: May 21, 2019

(54) ANIMATING A VIRTUAL OBJECT IN A VIRTUAL WORLD

(71) Applicant: NaturalMotion Ltd., Oxford (GB)

(72) Inventor: James Edward John Brewster, Sidmouth (GB)

(73) Assignee: NaturalMotion Ltd., Oxford (GB)

( * ) Notice: Subject to any disclaimer, the term of this patent is extended or adjusted under 35 U.S.C. 154(b) by 0 days.

(21) Appl. No.: 15/802,223

(22) Filed: Nov. 2, 2017

(65) Prior Publication Data

US 2018/0122125 A1    May 3, 2018

(30) Foreign Application Priority Data

Nov. 3, 2016 (GB) .................................. 1618526.6

(51) Int. Cl.
*G06T 13/20* (2011.01)
*G06T 13/40* (2011.01)

(52) U.S. Cl.
CPC .......... *G06T 13/40* (2013.01); *G06T 2213/12* (2013.01)

(58) Field of Classification Search
None
See application file for complete search history.

(56) References Cited

U.S. PATENT DOCUMENTS 6,057,859 A    5/2000  Handelman et al.
6,088,042 A *  7/2000  Handelman ............. G06T 13/40
                                                345/473

(Continued)

FOREIGN PATENT DOCUMENTS

CN    102708582 A    10/2012
GB       2499860 A     9/2013

OTHER PUBLICATIONS

"United Kingdom Application Serial No. 1618526.6, Response filed May 10, 2017 to Office Action dated May 2, 2017", 69 pgs.
(Continued)

*Primary Examiner* — Martin Mushambo
(74) *Attorney, Agent, or Firm* — Schwegman Lundberg & Woessner, P.A.

(57) ABSTRACT

A computer implemented method and a computer system for animating parts of a virtual object in a virtual world, accesses joint data for each joint of a chain of joints associated with parts of a virtual object, joint data including length data defining a vector length for a vector from the joint to a next joint, the length data corresponding to a length of a part in the virtual world; accesses data for a target curve for use in defining possible target locations for the joints of the parts of the virtual object, and retrieves or estimates a length of the curve; and processes the joint data to determine a total length of the vectors for the joints of the chain using the length data for the vectors; to determine scaled vectors by determining a scaled length for the vector for each joint of the chain based on the length of the curve and the total length of the vectors for the joints of the chain; to fit the scaled vectors for the joints of the chain to the curve by rotating the scaled vectors, with a first joint in the chain fitted to a start point on the curve and the last joint in the chain fitted at or near an end point on the curve; rescale the scaled vector for each joint of the chain to have the vector length; to set the first joint in the chain to the start point on the curve; and to determine locations for the joints by rotating the vectors to fit the last joint in the chain to the end point of the curve and to determine the locations of intermediate joints by distributing vector rotations for the intermediate joints among the vectors.

21 Claims, 21 Drawing Sheets

(56) References Cited

U.S. PATENT DOCUMENTS

2005/0041030 A1\* 2/2005 Isner ................. G06T 13/40
 345/473
2009/0002376 A1\* 1/2009 Xu .................... G06T 13/40
 345/473

OTHER PUBLICATIONS

"United Kingdom Application Serial No. 1618526.6, Office Action dated May 2, 2017", 5 pgs.

\* cited by examiner

ANIMATING A VIRTUAL OBJECT IN A VIRTUAL WORLD

CLAIM OF PRIORITY

This application claims the benefit of priority to United Kingdom Application Serial No. 1618526.6, filed on Nov. 3, 2016, which is incorporated herein by reference in its entirety.

FIELD OF THE INVENTION

The invention relates to the technical field of the animation of a virtual object in a virtual world.

BACKGROUND INFORMATION

It is known to author or generate animation for one or more virtual objects (also termed "characters") that are located in a virtual environment (or virtual world), such as a three-dimensional virtual environment of a video game or of a visual effects tool. The characters can consist of a hierarchy of joints, or a "rig", that form a skeleton. A skin or mesh may be overlaid (or rendered) on top of the rig, to thereby visually represent the character. By updating the location and orientation of the joints (i.e. changing the geometric configuration of the rig), the posture of the character and the position of the character within the virtual world may be updated, i.e. the character may be animated.

One known technique used in the animation of characters is inverse kinematics (IK) animation. This involves: (a) specifying desired target locations and/or orientations for one or more joints of the rig; (h) performing an inverse kinematics operation that determines angles/orientations for the joints of the rig in order to achieve those target locations and/or orientations (e.g. given a target location at which it is desired for a simulated human character to place a foot, the inverse kinematics animation then determines the angles/orientations for the joints of the rig for that character in order to try to achieve a posture for the character such that the foot is then placed at the target location); and (c) setting the angles/orientations for the joints of the rig to the determined angles/orientations.

DETAILED DESCRIPTION

Figure 1:
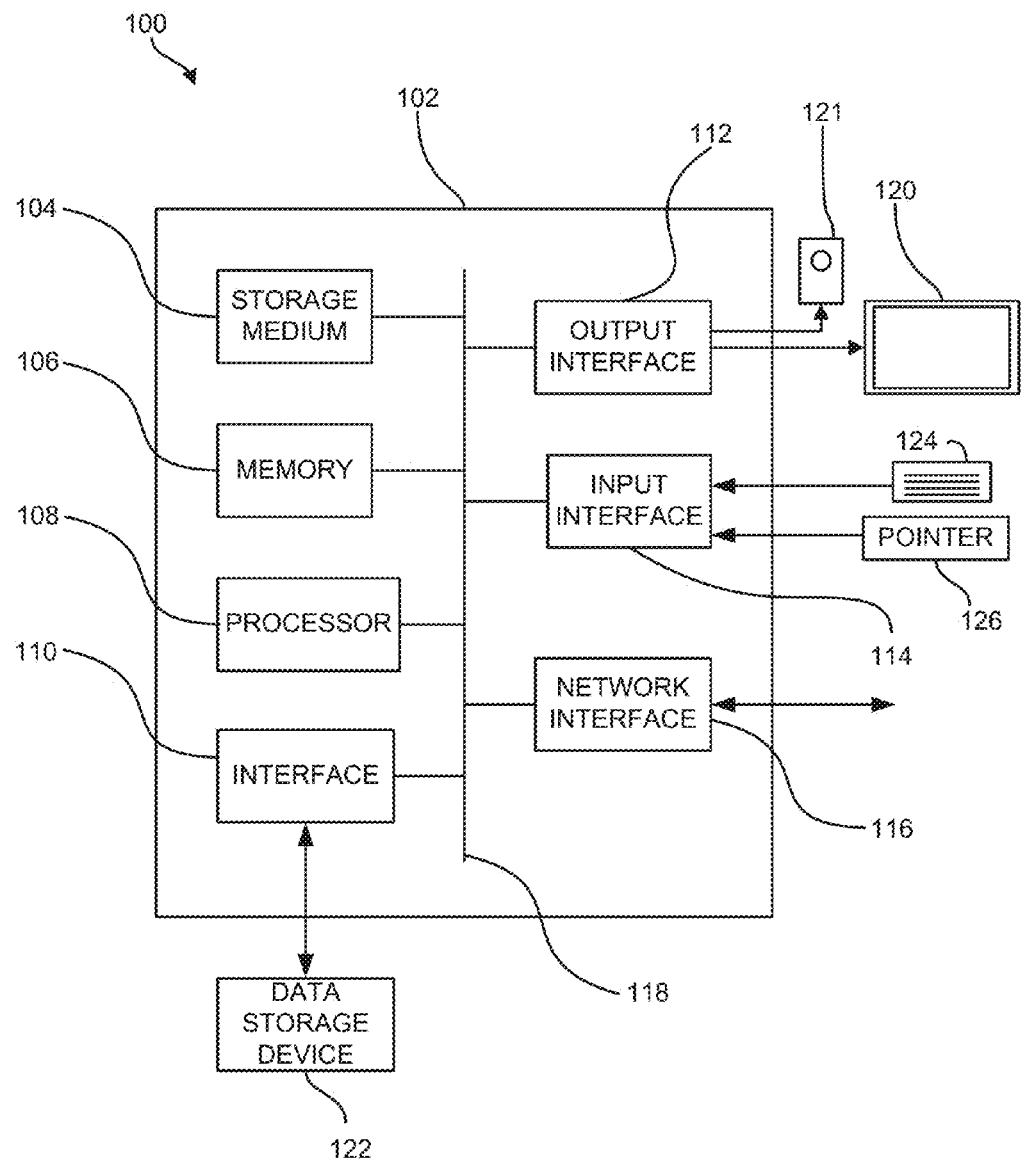
FIG. 1 schematically illustrates an example of a computer system.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

In the following embodiments, like components are labelled with like reference numerals.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Determining the desired locations of complex rigs formed of multiple joints in order to achieve the desired behaviour is complex. One method used to reduce the complexity is curve or spline IK in which the target locations are defined along a curve defined by the animator or by a program such as a game during play. The use of the curve defining a target function to which the joints are to be aligned allows the animator or program to simply define target locations. It also constrains the search to determine the location of the joint locations to the search to fit them to the curve. Curve or spline IK processes do not limit the end joint to an end location on a curve.

When an animator wishes to animate joints, such as a limb to reach a target, such as a handle of a door, it is necessary to define target transforms for the joints and a target location in 3D for the last joint in the chain. It is also desirable to create aesthetically natural looking angles for all the joints in the chain e.g. to make sure that a spine bends in a natural way.

A generalized embodiment provides a method and system for the animation of parts of a virtual object in a virtual world in which joint data for each joint of a chain of joints associated with parts of a virtual object is obtained or accessed. Joint data can represent a current state of a rig, which requires the determination of an updated configuration. The joint data includes length data defining a vector length for a vector from the joint to a next joint. The length data corresponds to a length of a part in the virtual world.

To update the geometric data for the rig, data for a target curve defining target locations for the joints of the parts of the virtual object is accessed, and the joint data is processed. The length of the curve is retrieved from the accessed data or determined e.g. by estimation.

The joint data is processed to determine a total length of the vectors for the joints of the chain using the length data. Scaled vectors are determined by determining a scaled length for the vector for each joint of the chain based on the length of the curve and the total length of the vectors for the joints of the chain. The scaled vectors for the joints of the chain are fitted to the curve by rotating the scaled vectors, with a first joint in the chain fitted to a start point on the curve and the last joint in the chain fitted at or near an end point on the curve. The scaled vector is rescaled for each joint of the chain to have the vector length, and the first joint in the chain is set to the start point on the curve. Locations for the joints are determined by rotating the vectors to fit the last joint in the chain to the end point of the curve and by determining the locations of intermediate joints.

Hence, the embodiment provides a two-step process in which in a first step natural joint angles are determined using scaled vectors in a curve fitting process, and in a second step, the rescaled joints are fitted to the ends of the curve and a best fit process determines the locations of the intermediate joints whilst trying to maintain the relative angles of the joints by distributing the angle changes required to rotate the joints to best fit between the start point and end point of the curve.

In one embodiment, the locations of the intermediate joints are determined by distributing vector rotations for the intermediate joints among the vectors In one embodiment, the scaled vectors have relative angles there between, and the locations of the intermediate joints are determined by rotating the vectors so that the relative angles there between substantially match the relative angles for the scaled vectors.

In one embodiment, the locations of the intermediate joints are determined by rotating the vectors to minimize the change in the angle of each vector relative to the angle of each respective scaled vector.

In one embodiment, a distance between the start point and the end point on the curve is less than the total length of the vectors for the joints of the chain. This ensures that the first and last joints of the chain of joints is able to be placed at the start point and end point of the curve.

In embodiments, the curve can comprise any curve such as a parametric curve or a spline curve.

In one embodiment, the locations for the joints are determined using inverse kinematics. Any known chain solving algorithm that can achieve a last joint to end point of the curve can be used for the second step, such as Jacobian Inverse, Cyclic Coordinate Descent (CCD), FABRIK, and NCF IK.

In one embodiment, each scaled vector is determined by multiplying the length of a corresponding vector by the ratio of the curve length and the determined the total length of the vectors for the joints of the chain.

Specific embodiments will now be described with reference to the drawings.

System Overview

FIG. 1 schematically illustrates an example of a computer system 100. The system 100 comprises a computer 102. The computer 102 comprises a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random-access memory (storage unit or volatile storage medium) suitable for storing data and/or computer programs or software or instructions or code).

The processor 108 may be any data processing unit suitable for executing one or more computer programs (such as those stored on the storage medium 104 and/or in the memory 106), some of which may be computer programs according to embodiments or computer programs that, when executed by the processor 108, cause the processor 108 to carry out a method according to an embodiment and configure the system 100 to be a system according to an embodiment. The processor 108 may comprise a single data processing unit or multiple data processing units operating in parallel, separately or in cooperation with each other. The processor 108, in carrying out data processing operations for embodiments, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally, or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data or computer code from and/or upload data or computer code to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments. As examples, the computer system 100 could comprise one or more of: a personal computer; a server computer; a mobile telephone; a tablet; a laptop; a television set; a set top box; a games console; other mobile devices or consumer electronics devices; etc.

Animations and Data for Animations

Figure 2:
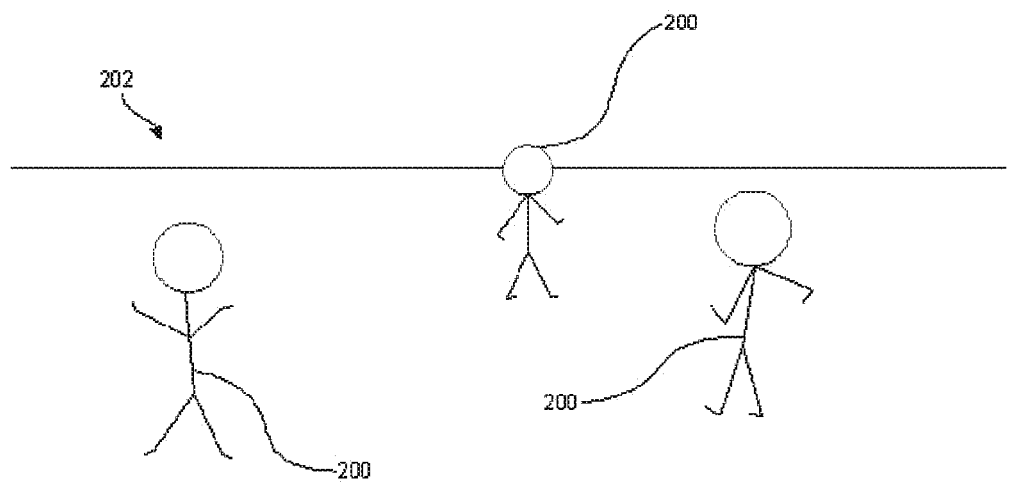
FIG. 2 schematically illustrates example virtual objects within a virtual world.

Embodiments are concerned with animations and, in particular, an animation of a virtual object (or a character) that is located (or resides) within a virtual world (or environment). FIG. 2 schematically illustrates three example virtual objects 200 within a virtual world 202. The virtual objects 200 shown in FIG. 2 (and the rest of this application) represent human beings, but it will be appreciated that embodiments are equally applicable to animations of virtual objects that represent other articles, items, animals, etc. and other types, structures and forms of object that have different intended representations. The virtual world 202 may be any virtual environment, arena or space containing the virtual objects 200 and in which the virtual objects 200 may be moved or animated. Thus, the virtual world 202 may represent a real-world location, a fictitious location, a building, the outdoors, underwater, in the sky, a scenario/location in a game or in a movie, etc. The animation of the virtual object 200 may form a part of a computer game being executed by the processor 108 of the computer system 100, with the animation being generated/computed in real-time. The animation of the virtual object 200 may be generated/computed so as to output a video animation to form part of a film/movie (in which case the generation/computation need not be in real-time). The animation of the virtual object 200 may be generated/computed for other purposes (e.g. computer simulations that involve objects moving and interacting in an environment).

An animation for an object 200 comprises performing an update process at each time point (also referred to as an animation update step) in a series of time points (or a series of animation update steps or update time points). These time-points may correspond to video frames, video fields, or any other time or display frequency of interest—for the rest of this description, the time-points shall be assumed to correspond to video frames, but it will be appreciated that this is only an example and should not be taken as limiting. For example, in some embodiments, one or more animation update steps may be carried out between successive video frames/fields and this number may or may not be constant over time. It will be appreciated that the display frequency the frequency at which a display process displays or renders an image of the virtual world 202) need not necessarily be linked to the frequency of performing the update process. The update process performed at the animation update step updates values for attributes of (or associated with) the object 200. These attributes may correspond to, for example, the location and/or orientation of one or more object parts of the object 200 (e.g. the location and/or orientation of the limbs, neck, digits, head, etc. of a human object 200). Thus, in updating the values for the location and/or orientation object attributes, the object 200 is moved within the virtual world 202. However, the attributes associated with the object 200 are not limited to location and/or orientation object attributes, as discussed below.

In the embodiments described below, the animations relate to so-called "skeletal animation", but it will be appreciated that different types or styles of animation fall within the scope of other embodiments. The object attributes for an object 200 may be represented by some or all of the following data (depending on the type of animation and how the object 200 and its attributes are to be represented): (a) topological data; (b) geometric data; (c) trajectory data; (d) skinning data; and (e) rendering data. These data are described in more detail below. It will be appreciated that the object 200 may have attributes in addition to, or as alternatives to, the attributes as described further below with reference to the various data (a)-(e).

Figure 3:
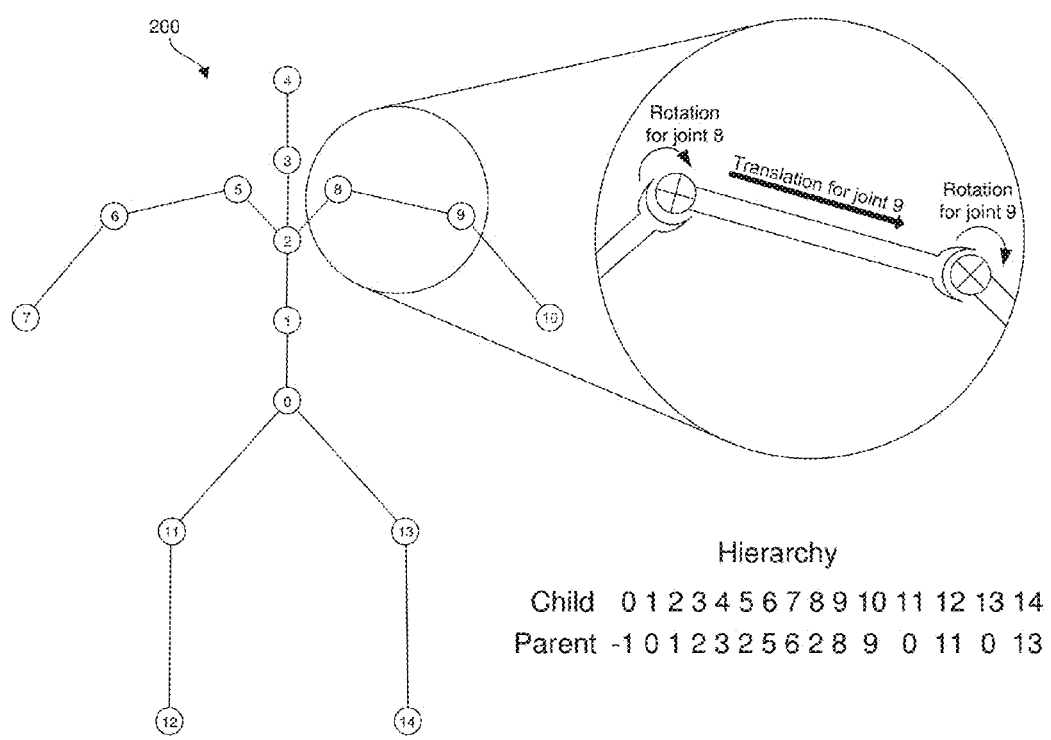
FIG. 3 schematically illustrates an object for an animation according to an embodiment.

FIG. 3 schematically illustrates an object 200 for an animation according to an embodiment. The object 200 comprises a plurality of object sections (or "bones") linked together by respective joints. In FIG. 3, the sections of the object 200 are the straight lines whilst the joints of the object 200 are the numbered circles.

In general, a joint is a (simulated) point or surface or location of contact between two or more object sections so that that joint links (or creates an association between) those sections. In other words, such a joint forms a simulated connection or tie between object sections (in the same way that, for example, a forearm is connected to an upper arm by virtue of an elbow joint). In this way, an object section may have one or more joints associated with it. A joint normally occurs at an end of the object section(s) with which it is associated.

Some joints (such as joint 10 in FIG. 3) occur at the end of an object section, but do not link that section to another section. These joints merely serve to indicate the location of the free i.e. unconnected) end of that section.

In some embodiments, each object section is "rigid" in that the distance between the joints associated with that section is constant, although, of course, each rigid section may have its own length/distance, which may be different from the length/distance for the other rigid sections. However, it will be appreciated that in other embodiments one or more of the sections of the object 200 may not be "rigid".

The object 200 may therefore be considered to comprise a plurality of object parts. In some embodiments, the topological data represents the object 200 as a plurality of joints (i.e. the object parts are just the joints). In some embodiments, the topological data represents the object 200 as a plurality of object sections (i.e. the object parts are just the bones). In some embodiments, the topological data represents the object 200 as a plurality of joints together with a plurality of object sections. The actual representation does not matter for embodiments and therefore in this description the topological data shall represent the object 200 as a plurality of joints and it will be appreciated that the use herein of the term "joint" encompasses both joints and/or bones unless stated otherwise or unless clearly not appropriate. However, the skilled person will appreciate that the following description may be applied analogously to the alternative styles of representation.

The object parts may be considered as forming a skeleton, or framework or "rig", for the object 200.

The object parts (joints in this representation) are linked together, or are associated with each other, in a hierarchy. The hierarchy of joints illustrated in FIG. 3 may be represented by table 1 below:

TABLE 1

| Joint ID | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Parent ID | −1 | 0 | 1 | 2 | 3 | 2 | 5 | 6 | 2 | 8 | 9 | 0 | 11 | 0 | 13 |

In this hierarchy of joints for the object 200, each joint, other than a central, basis root joint (labelled with a joint ID of 0) is a child of another joint in the hierarchy, i.e. every joint other than that root joint is associated with (or linked to) a second joint in the hierarchy (by virtue of a connecting object section), where that second joint is considered to be the parent of that joint. The fact that the central joint is not a child of another joint (and therefore has no parent joint) is represented in table 1 by indicating a parent ID of −1. For example, joint 2 is a child of joint 1 and itself has three children, namely joints 3, 5 and 8. As another example, joint 10 is a child of joint 9, but has no children itself. A joint such as joint 10 that has no child joints (i.e. a joint that is not itself a parent) is included so as to represent a "terminating end" of a section of the object 200, i.e. to indicate the location of the extremities of the object 200. Due to the connecting nature of the object sections that link joints, the movement, position and orientation of a joint in the virtual world 202 is affected by the movement, position and orientation of the parent of that joint in the virtual world 202.

The topological data for the object 200 is data that represents the hierarchy (or hierarchies) or structure of the object parts, i.e. data defining the parent-child relationships between the various object parts that make up the object 200. For example, the topological data for the object 200 may be stored in the form of table 1 above.

The geometric data for the object 200 represents the relative positions and orientations of the object parts. The values given to the geometric data represent the positioning or configuration of the object 200 in a particular posture or stature. In effect, the attributes for the object 200 represented by the geometric data are the length of each object section (bone) together with that bone's orientation relative to its parent bone, i.e. this geometric data represents the distance between a joint and its parent joint, together with the orientation of that joint relative to the parent joint. There are many well-known ways of representing this geometric data, such as: (a) using respective transformation matrices for the joints; (b) using respective pairs of 3×3 rotation matrices and 1×3 translation matrices; or (c) using respective quaternions. As these methods are well-known, and as the particular method used is not important for embodiments, these methods shall not be described in more detail herein. An example representing some of the geometric data for joints 8 and 9 is shown in FIG. 3.

The geometric data for a particular joint is normally defined in a coordinate space local to the parent of that joint (i.e. in which that parent is fixed). Thus, for example, if a "shoulder joint" 8 of FIG. 3 moves but the "elbow joint" 9 of FIG. 3 does not move relative to the shoulder joint, then the geometric data 308 for the elbow joint would not change.

The skinning data is data that enables so-called "skinning" for the animation. The process of skinning is well-known in this field of technology and shall not be described in more detail herein—it takes a definition of the surface of the object 200 and attaches it to the skeleton formed by the object parts (the joints and/or bones). The skinning data is therefore data defining this object surface, which is an attribute of the object 200.

The rendering data is data that enables so-called "rendering" of the animation. The process of rendering is well known in this field of technology and shall not be described in more detail herein—it actually outputs or displays the skinned surface with relevant textures, colors, lighting, etc. as appropriate. The rendering data is therefore data defining the textures, colors, lighting, etc., which are attributes of the object 200.

Figure 4:
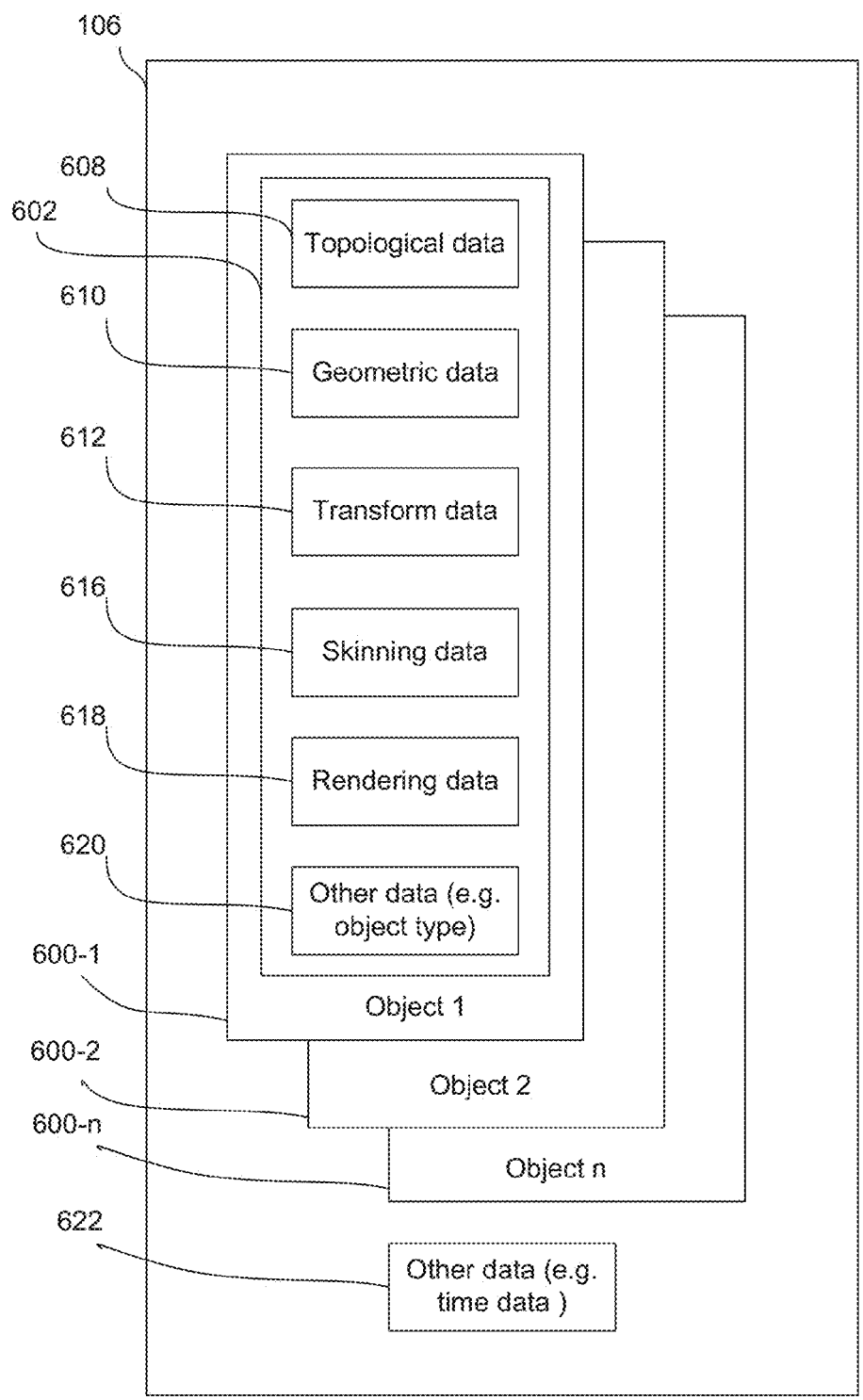
FIG. 4 schematically illustrates some of the data that may be stored in a memory of the computer system of FIG. 1 for embodiments.

FIG. 4 schematically illustrates some of the data that may therefore be stored in the memory 106 (or additionally or alternatively stored in the storage medium 104 or the data storage device 122, or which may be accessible via the network interface 116). There may be respective data 600 for one or more objects 200—in FIG. 4, there are n objects 200, each with their own data 600-1, 600-2, ..., 600-n. The data 600 for an object 200 may include a set 602 of attribute data for that object 200, including one or more of: topological data 608; geometric data 610; transform data 612; skinning data 616; rendering data 618; and other data 620 specific to that object (e.g. a type of the object 200). There may also be stored other data 622 (such as data defining a time within a computer game or a movie; data defining or describing the virtual world 202; and curve data defining curve types for joint fitting; etc.) which is not specific to any one particular object 200.

Inverse Kinematics and Effectors

"Effectors" and "inverse kinematics" are well-known in this field of technology, but as embodiments relate to the use of effectors and inverse kinematics (referred to herein as IK), they shall be described in more detail below. However, it will be appreciated that the skilled person would be aware of effectors and IK and any known aspects of effectors and inverse kinematics that are not set out below.

An effector is a constraint or target or goal to be achieved by the IK processing. An effector is related to (or associated with, or defined/specified for) a corresponding joint of the object 200. An effector for a joint may represent a desired position and/or orientation for (or associated with) that joint of the object 200 (for example, defined either within the virtual world 202 or relative to the object 200 or relative to that joint). Examples include:

- In the animation of an object 200 representing a person moving (e.g. walking) through the virtual world 202, an effector might be specified for a neck joint and/or a head joint of the person which constrains the orientation of the neck and/or head joints so that the head faces in a particular direction, i.e. so that, during the animation, the person appears to be looking at a fixed point within the virtual world 202.
- In the animation of an object 200 representing a person, an effector may be specified for a hand joint of the person, where the effector specifies that, during the animation, the hand should be moved to a particular location within the virtual world 202 (e.g. to move towards a simulated button in the virtual world 202 so as to then press that button).
- In the animation of an object 200 representing a person, an effector may be specified for a hand joint of the person, where the effector specifies that, during the animation, the hand should point towards another object in the virtual world 202, which may be a moving object (so as to "track" that moving object).

It will be appreciated there are many other types of effector that might be specified for an animation and that the above are provided merely as examples to help demonstrate the notion of an effector.

In one embodiment, each joint of the object 200 is associated with one effector lying at a point along a defined target curve.

It will be appreciated that a curve defining the effectors may be generated dynamically, for example: depending on events that occur during a computer game or animation simulation, or based on commands that are issued by a user (e.g. when a player of a game presses one or more buttons on a game controller to instruct a game character to perform an action).

It is possible to use an IK process to derive (or calculate or determine), for one or more joints of the object 200, a joint angle, so that, when those joint angles are applied to their respective joints, the object 200 will satisfy (or at least try to satisfy) those effectors. IK is well-known in this field of technology (see, for example, http://en.wikipedia.org/wiki/Inverse_kinematics, the entire disclosure of which is incorporated herein by reference). The IK processing results in a set of effectors defining a "solution", where that solution is a set of joint angles for one or more joints of the object 200.

The process of curve IK is a method of defining a target curve on which the effectors or targets can be determined using inverse kinematics. The curve defines a function at points along which the effectors lie. The curve comprises a continuous parametric function that provides a position and geometric properties of a continuous line in 3D. Each parameter of the function defines a different position in 3D. In curve IK a continuous curve is defined by control points, namely a start control point defining a start location, and orientation for the curve and the definition of the parametric curve (the curve shape), and an end control point defining the end location of the curve. Intermediate control points may also be defined to enable control of the curve at these points e.g. to enable a twist to be applied to the curve or even to allow complex curve shapes to be defined by concatenating curve shapes (functions).

The problem with using an IK process is that the resultant joint locations do not always provide a natural looking result.

An alternative to the IK process is a curve or spline IK solve. This process produces a more natural result that fits the joints to the curve and is particularly good for long chains of bones like spines or tentacles. However, this process is not good when wanting the end joint on the chain to reach a specific target position in 3D space since the end joint location is not defined at the end of the curve.

Embodiments will now be described with reference to FIGS. 5 to 11 in which the chain of joints can be fitted to a defined target curve when the distance between the ends of the target curve is less than the length of the sum of the lengths of the vectors of the joints in a chain. Although the curve is shown in 2D, in a 3D animation world, the curve is a 3D curve.

FIGS. 5a to 5f schematically illustrate the process used for fitting joints to a target curve according to one embodiment. In this embodiment, the ends of the curve are located at a distance less than the combined lengths of the vectors for the joints of the chain to be fitted to the curve. Also, the length of the curve is less than the combined lengths of the vectors for the joints of the chain to be fitted to the curve.

Figure 5A:
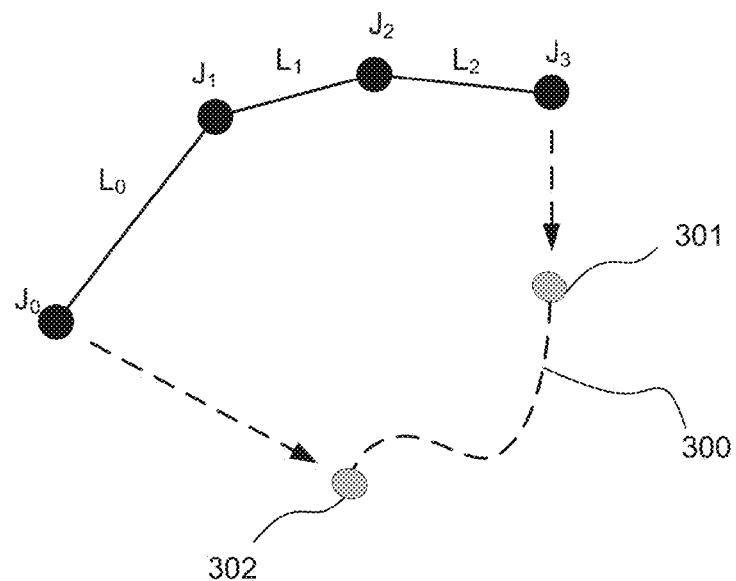
FIGS. 5a to 5f schematically illustrate a process for the fitting of a chain of joints to a defined target curve according to one embodiment.

As can be seen in FIG. 5a, a chain of joints $J_0$, $J_1$, $J_2$ and $J_3$ has associated vector lengths $L_0$, $L_1$ and $L_2$. The chain of joints shown in FIG. 5a represents a starting chain configuration. A curve 300 is defined having a start point 302 and an end point 301. The aim of the process to facilitate animation with a target end point requires the first joint to be fitted to the start point 302 of the curve and the last joint to be fitted to the end point 301 of the curve as indicated by the dotted arrows in FIG. 5a.

The first step in the process is the scaling of the vector lengths $L_0$, $L_1$ and $L_2$ of the vectors to the length of the curve. The scaling is carried out using the equations:

$$L'_i = L_i(L_T/\Sigma L_i) \text{ for the vector index along the chain}$$
$$i = o \text{ to } n-1$$

where $L'_i$ is the length of scaled vector, $L_i$ is the original vector length, $L_T$ is the length of the curve, and $\Sigma L_i$ is the sum of the vector lengths for the joints in the chain.

Figure 5B:
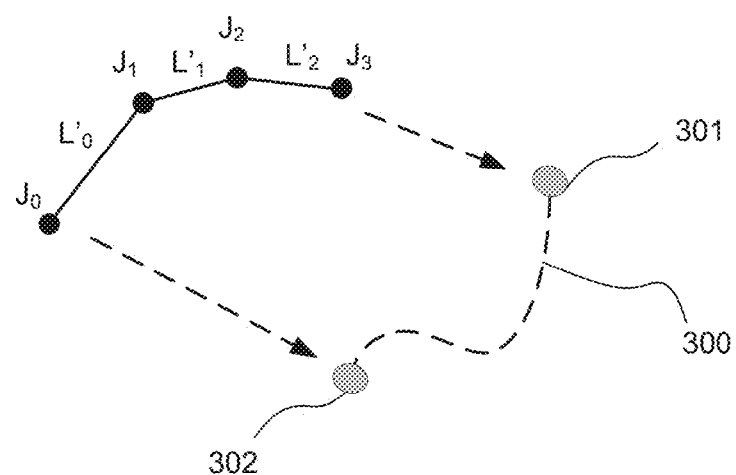

The scaled vectors for the joints in the chain are illustrated schematically in FIG. 5b.

The aim of the first step of the process is to create a chain length that approximates the length of the curve so that the vectors can be fitted to the curve. With the first vector at the start point of the curve and the last vector at the end point of the curve.

Figure 5C:
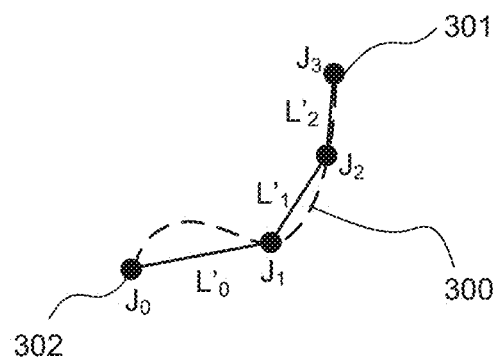

FIG. 5c illustrates the end result of a curve fitting process whereby the vectors are fitted to the curve with the first vector at the start point 302 of the curve, the last vector at or near the end point 301 of the curve, and intermediate vectors fitted to intermediate locations along the curve 300. The last joint may lie in the region of the end point of the curve and not at the end point due any error in the estimation of the curve length and due to the error of matching straight vectors to a curve.

Hence, at the end of step one a scaled vector chain having a natural configuration is generated.

Figure 5D:
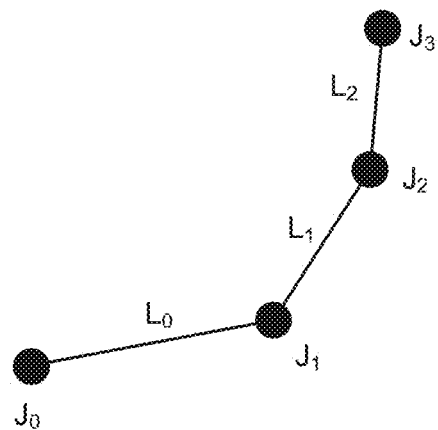

To initiate the start of the second step the scaled vector chain must be rescaled so that the vectors have their original vector lengths. The vectors retain the vector angles determined in the curve fitting process of the first step of the process. The resulting rescaled vector chain is illustrated in FIG. 5d.

Figure 5E:
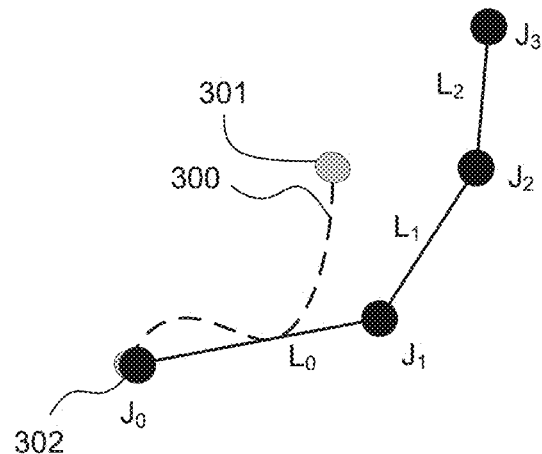
Figure 5F:
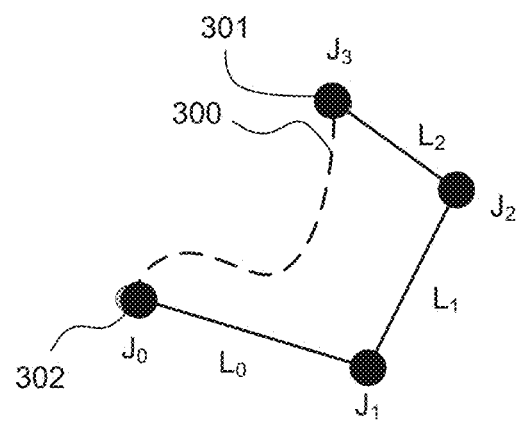

The second step of the curve fitting process requires the first joint to be located at the start point 302 of the curve 300 as shown in FIG. 5e, A chain or IK solver is then executed to fit the last joint to the end point 301 and to find 3D locations for the intermediate joints as shown in FIG. 5f.

The second step using a chain solver aims to best fit the scaled up chain of joints to the curve between the start and end point to try to retain the natural shape determined in the first step. To do this, the locations of intermediate joints are determined by distributing vector rotations for the intermediate joints among the vectors so that the rotations of the vectors do not change the relative shape. In other words, the locations of the intermediate joints are determined by rotating the vectors to minimize the change in the angle of each vector relative to the angle of each respective scaled vector. The scaled vectors have relative angles and the locations of the intermediate joints can be determined by rotating the vectors so that the relative angles between the vectors substantially match the relative angles between the scaled vectors.

It can be seen in FIG. 5f that since the vector lengths of the chain are longer that the curve length, the joint locations are located on an outside of the circumference the curve.

FIGS. 6a to 6f schematically illustrate the process used for fitting joints to a target curve according to another embodiment. In this embodiment, the ends of the curve are located at a distance less than the combined lengths of the vectors for the joints of the chain to be fitted to the curve. Also, the length of the curve is more than the combined lengths of the vectors for the joints of the chain to be fitted to the curve.

Figure 6A:
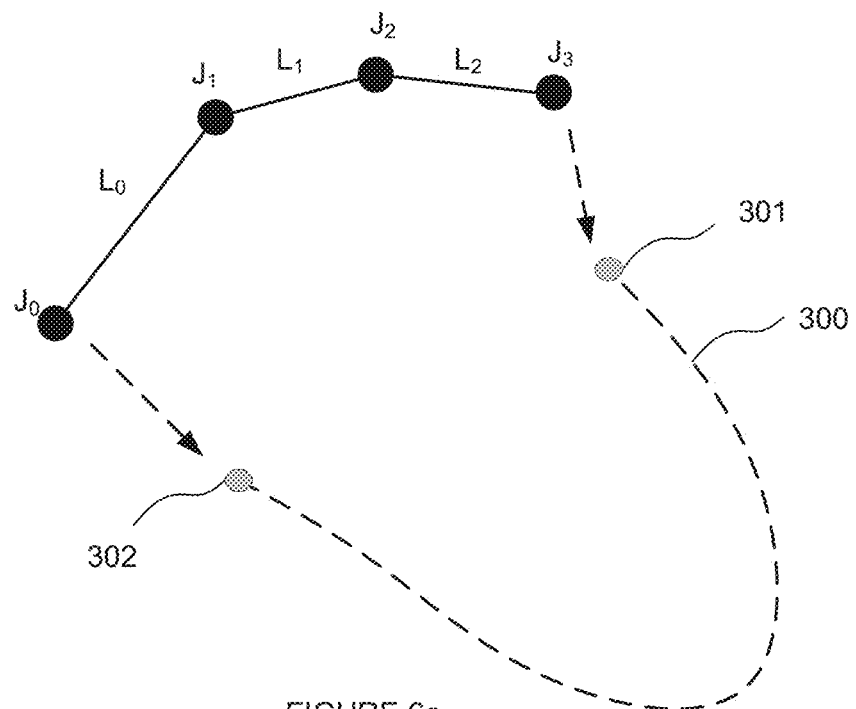
FIGS. 6a to 6f schematically illustrate a process for the fitting of a chain of joints to a defined target curve according to another embodiment.

As can be seen in FIG. 6a, a chain of joints $J_0$, $J_1$, $J_2$ and $J_3$ has associated vector lengths $L_0$, $L_1$ and $L_2$. The chain of joints shown in FIG. 6a represents a starting chain configuration. A curve 300 is defined having a start point 302 and an end point 301. The aim of the process to facilitate animation with a target end point requires the first joint to be fitted to the start point 302 of the curve and the last joint to be fitted to the end point 301 of the curve as indicated by the dotted arrows in FIG. 6a.

The first step in the process is the scaling of the vector lengths $L_0$, $L_1$ and $L_2$ of the vectors to the length of the curve. The scaling is carried out using the equations:

$$L'_i = L_i (L_T / \Sigma L_i) \text{ for the vector index along the chain}$$
$$i = o \text{ to } n-1$$

where $L'_i$ is the length of scaled vector, $L_i$ is the original vector length, $L_T$ is the length of the curve, and $\Sigma L_i$ is the sum of the vector lengths for the joints in the chain.

Figure 6B:
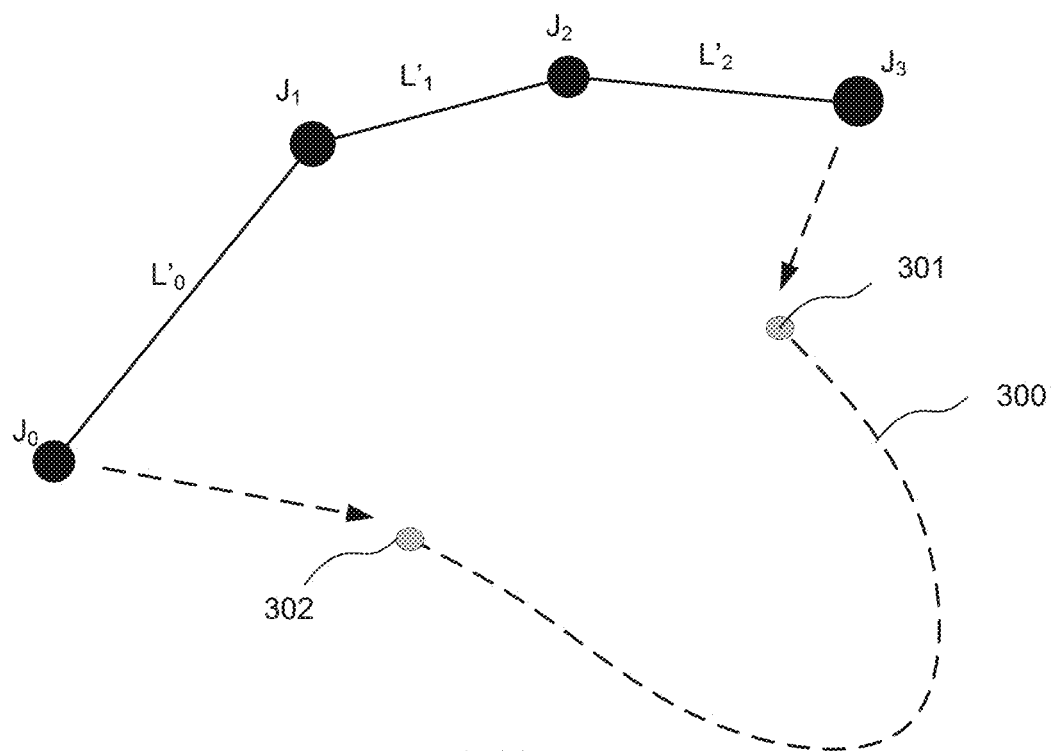

The scaled vectors for the joints in the chain are illustrated schematically in FIG. 6b.

The aim of the first step of the process is to create a chain length that approximates the length of the curve so that the vectors can be fitted to the curve. With the first vector at the start point of the curve and the last vector at the end point of the curve.

Figure 6C:
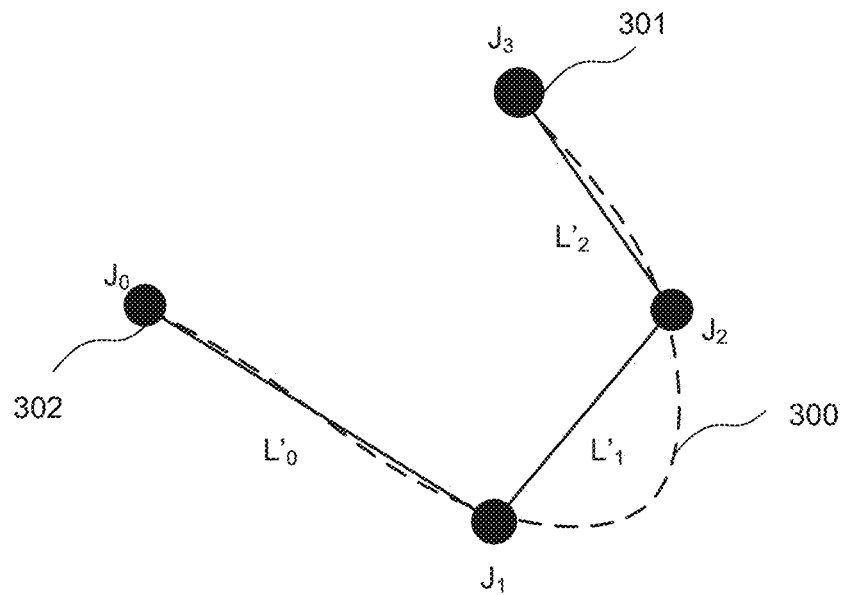

FIG. 6c illustrates the end result of a curve fitting process whereby the vectors are fitted to the curve with the first vector at the start point 302 of the curve, the last vector at or near the end point 301 of the curve, and intermediate vectors fitted to intermediate locations along the curve 300. The last joint may lie in the region of the end point of the curve and not at the end point due any error in the estimation of the curve length and due to the error of matching straight vectors to a curve.

Hence, at the end of step one a scaled vector chain having a natural configuration is generated.

Figure 6D:
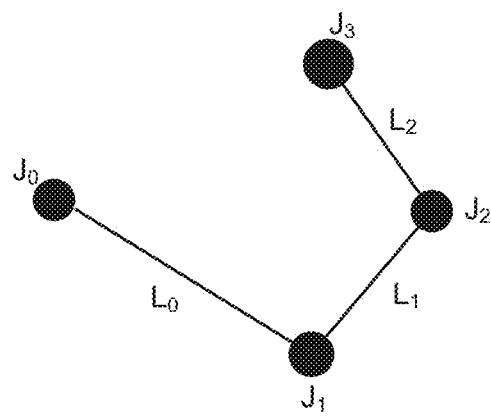

To initiate the start of the second step the scaled vector chain must be rescaled so that the vectors have their original vector lengths. The vectors retain the vector angles determined in the curve fitting process of the first step of the process. The resulting rescaled vector chain is illustrated in FIG. 6d.

Figure 6E:
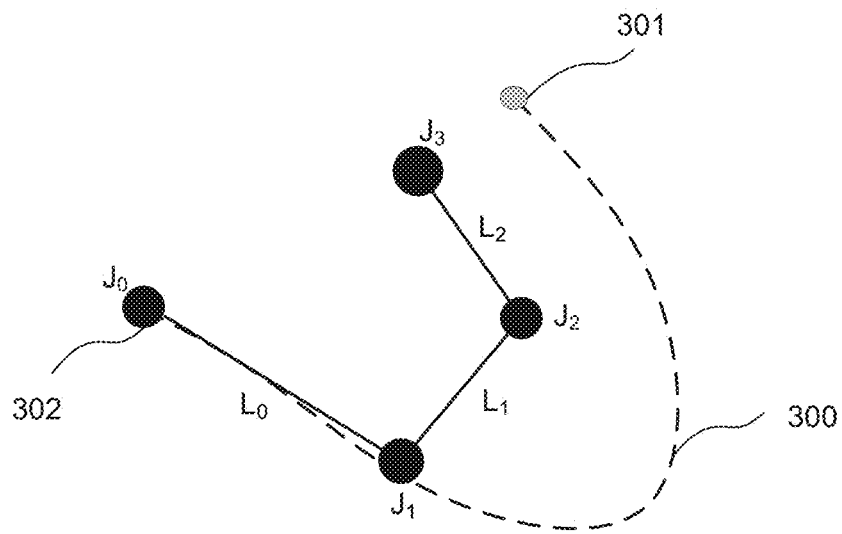

The second step of the curve fitting process requires the first joint to be located at the start point 302 of the curve 300 as shown in FIG. 6e. A chain or IK solver is then executed to fit the last joint to the end point 301 and to find 3D locations for the intermediate joints as shown in FIG. 6f.

The second step using a chain solver aims to best fit the scaled-up chain of joints to the curve between the start and end point to try to retain the natural shape determined in the first step. To do this, the locations of intermediate joints are determined by distributing vector rotations for the intermediate joints among the vectors so that the rotations of the vectors do not change the relative shape. In other words, the locations of the intermediate joints are determined by rotating the vectors to minimize the change in the angle of each vector relative to the angle of each respective scaled vector. The scaled vectors have relative angles and the locations of the intermediate joints can be determined by rotating the vectors so that the relative angles between the vectors substantially match the relative angles between the scaled vectors.

Figure 6F:
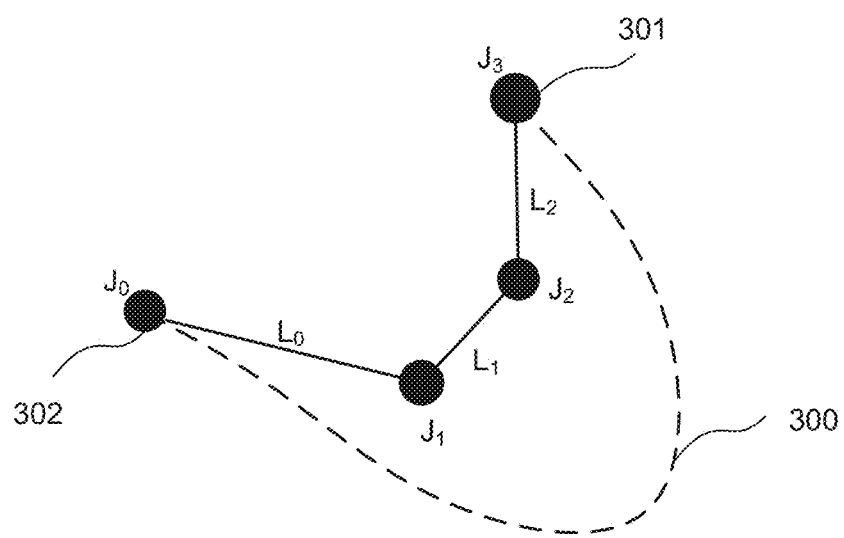

It can be seen in FIG. 6f that since the vector lengths of the chain are shorter that the curve length, the joint locations are located on an inside of the circumference the curve.

The end point on the curve is a parameter that can be defined and controlled by an animator or a control program such as a computer game. It would generally be defined at the end of a curve but may be defined at a location along a curve.

The reason for the defining of an end target location, usually be defining the location of the end of a curve, is to define the location of the end joint and to require the intermediate joints to best fit between the first and end joints. The definition of the end joint location can be to allow an animator or control program to define a limit due for example to the position of other virtual objects in the virtual world. For example, the chain of joints being animated may comprise a tentacle reaching for a door and hence the end joint must be prevented from extending through the door in an unnatural manner.

Inverse Kinematics Chain Solvers

The chain or IK solvers for the performance of the second step illustrated in FIGS. 5e and f and 6e and f can comprise any known chain or IK solver.

There are many techniques to solving the IK problem, but the commonly used ones can be loosely categorized in to three groups:

1. Analytical: Find a closed-form solution, so they are fast e.g. 2bone, NCF IK.

2. Iterative: Iterative approaches take multiples steps towards a solution. The more common are CCD and differential techniques. These techniques move joints looking to minimize an error function by using heuristics or by relating small changes in angles to changes in position (Jacobian). They require several iterations to reach a solution. In heuristic approaches, if errors are considered for individual joints, the result can be very unrealistic (great difference between earlier and later joints).

3. Newtonian: These algorithms seek target configurations which are posed as solutions to a minimization problem, hence they return smooth motion without erratic discontinuities. However, the Newton methods are complex, difficult to implement and have high computational cost per iteration.

Non-Iterative, Closed-Form Inverse Kinematic Chain Solver (NCF IK)

This solver works by iterating once through each joint and bone combination calculating new joint angles. It starts with the Start Joint. How each new joint angle is calculated depends on how many bones in the chain remain to be processed.

1 Bone Remaining

Figure 7A:
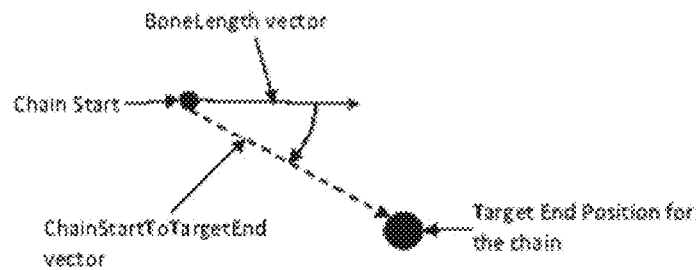
FIGS. 7a to 7e schematically illustrate the operation of a Non-Iterative, Closed-Form Inverse Kinematic Chain Solver (NCF IK) for the second step illustrated in FIGS. 5e and 5f and 6e and 6f according to one embodiment.

Align bone along the vector ChainStartToTargetEnd. This is done by rotating the bone by the angle between the BoneLength vector and the ChainStartToTargetEnd vector. The axis of rotation is perpendicular to both of these vectors and it can be found by calculating their cross product. This is shown in FIG. 7a.

2 Bones Remaining

Figure 7B:
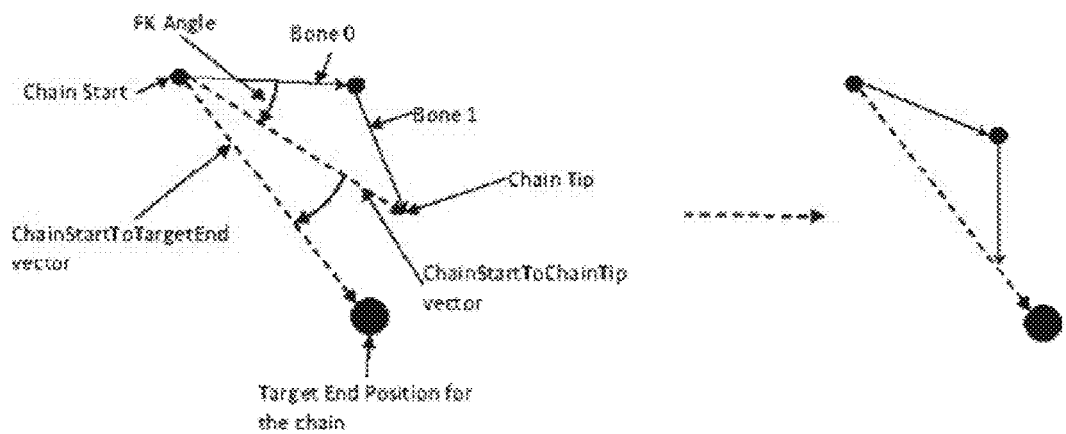

1. Align chain to the TargetEndPosition by rotating vector ChainStartToChainTip on to ChainStartToTargetEnd. This is shown in FIG. 7b. The angle of rotation is given by the angle between the ChainStartToChainTip vector and the ChainStartToTargetEnd vector. The axis of rotation is perpendicular to both of these vectors and it can be found by calculating their cross product.

2. Calculate the Required Rotation of Bone 0

Figure 7C:
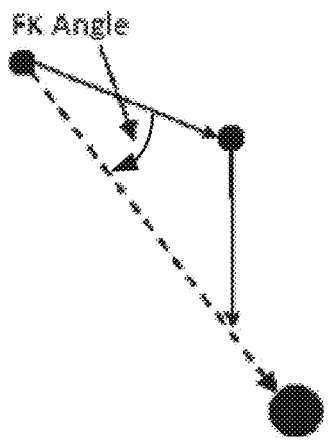
Figure 7D:
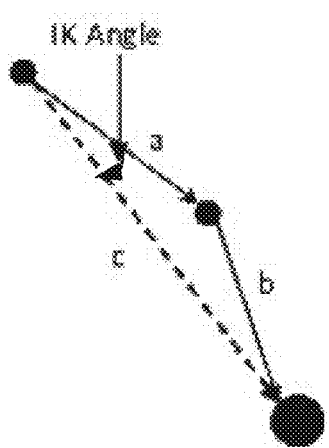

This can be done using the law of cosine to provide the configuration illustrated in FIG. 7c and the configuration illustrated in FIG. 7d is required.

To calculate the IKAngle:
a=Bone 0 length
b=Bone 1 length
c=Chain Start to Target End distance
To calculate the IKAngle:
a=Bone 0 length
b=Bone 1 length
c=Chain Start to Target End distance $$IKAngle = \cos^{-1}\left(\frac{a^2 - b^2 + c^2}{2ac}\right)$$

After this a Delta. Angle can be calculated to apply to the current FKAngle in order to take the bone to the required IK Angle: DeltaAngle=FKAngle−IKAngle The axis to rotate about is the cross product of the ChainStartToTargetEnd vector and the ChainStartToChainTip vector. The same axis calculated for step 1.

3 Bones and More

Figure 7E:
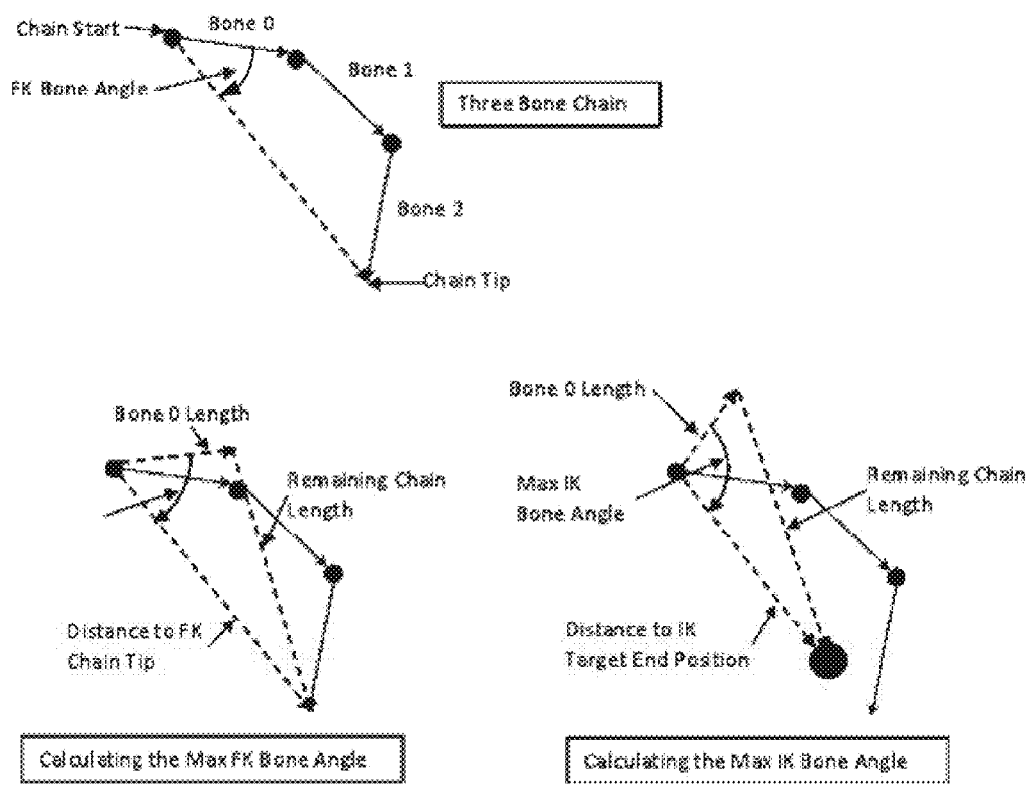

An angle for Bone 0 needs to be found. This is illustrated in FIG. 7e.

FKBoneAngle=current angle of bone to the ChainStartToChainTip vector.

MaxFKBoneAngle=angle of Bone 0 if the Chain Tip is at its starting FK position and the remaining chain is straight.

MaxIKBoneAngle=angle of Bone 0 if the Chain Tip is at the IK Target

End Position and the remaining chain is straight.

These values can be calculated using the law of cosines.

BoneAngleFraction=FKBoneAngle/MaxFKBoneAngle: Defines the FK bone angle relative to the distance to the FK chain tip. In other words, how much of the maximum rotation available is this bone using.

IKBoneAngle=MaxIKBoneAngle*BoneAngleFraction: Gives the IK solved angle for Bone0. This calculation means that the proportion of the MaxIKBoneAngle used by Bone0 will be the same proportional use of the MaxFKAngle in the starting FK pose. This means that the starting pose angles are maintained as much as possible and any modification is distributed proportionally along the chain.

Update Function

```
Function SolveIKChain( chain )
begin
    calculate chain target alignment
    for each bone in chain
    begin
        apply chain target alignment to bone
        if bone is last bone
            aim bone at target
        else if bone is second last
            use trigonometry to calculate bone angle
        else
        begin
            determine FKBoneAngle
            determine MaxFKBoneAngle
            determine MaxIKBoneAngle
            IKBoneAngle = ( FKBoneAngle MaxFKBoneAngle ) *
        MaxIKBoneAngle
        end
    end
end
```

Cyclic Coordinate Descent (CCD)

CCD is an iterative solver

For each joint in turn:

Rotate the joint so that the line from this joint to the Target End Position (the line of action) passes through the target If this rotation is not possible (hinge joint, joint limits etc), get as close as possible Standard sequence starts with joints closest to the end effector, goes down to the root, and back up This means motion at the 'branches' is favoured This process is repeated until the Chain Tip is within a specified error distance of the Target End Position.

Figure 8:
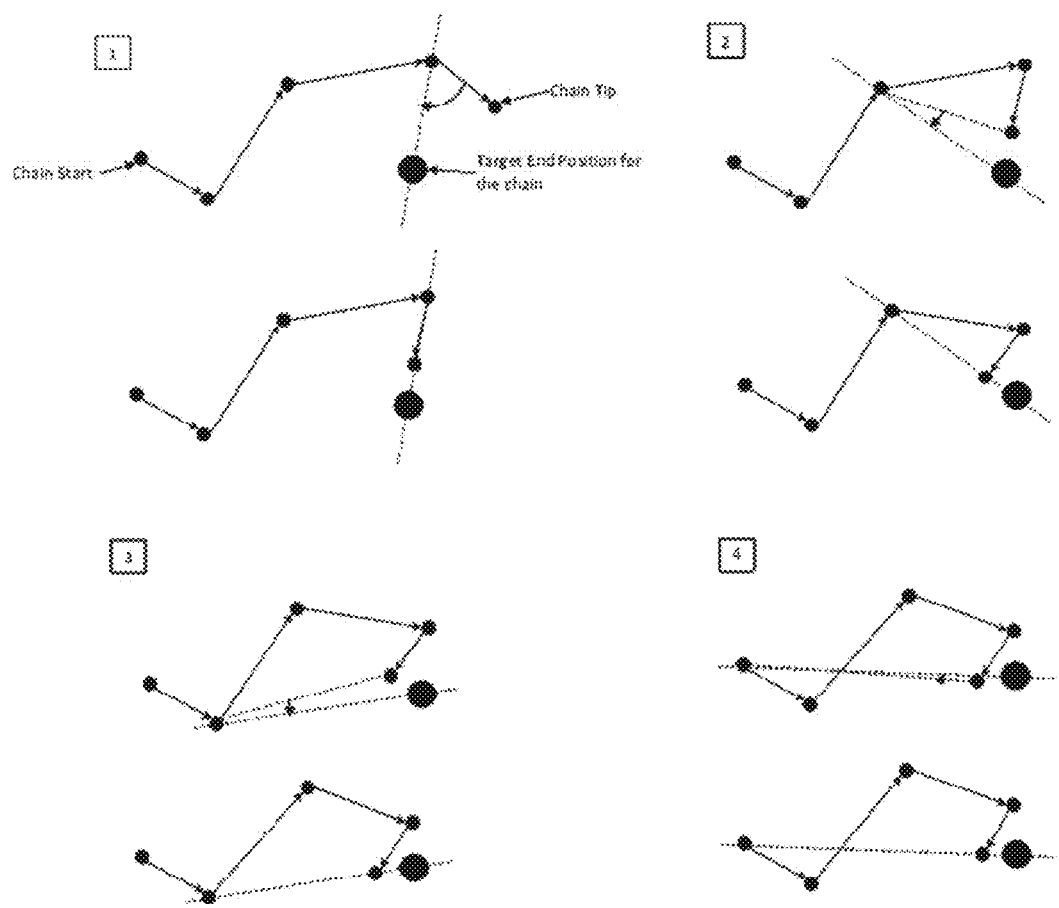
FIG. 8 schematically illustrates the operation of a Cyclic Coordinate Descent (CCD) method for the second step illustrated in FIGS. 5e and 5f and 6e and 6f according to one embodiment.

FIG. 8 shows one iteration of a four-bone chain.

CCD is a 'semi-analytical' method.

The rotation of each joint is fully determined and non-approximate

But there is no fixed bound on the number of adjustments of each joint before the target is reached.

CCD is guaranteed to converge to something closer to the target

Jacobian Inverse Kinematics

Every joint in a chain has a parent joint, apart from the root joint. Each joint has a transform that describes its position in space. This transform can be expressed as being relative to the parent joint transform. This can be expressed in matrix form as a rotation R and a translation T.

In forward kinematics, to determine the world relative transform of a joint, it is necessary to accumulate in chain hierarchy order all of the parent joint transforms of this joint:

$$F_n = \coprod_{i=n}^{0} R_i T_i$$

In vector form this can be written as:

$$X = f(\theta)$$

θ=vector of joint orientations.

X=vector representing the transforms of some joints in the chain that are to act as end effectors. Each end effector will have a target transform.

f( )=the FK function that converts from θ to X.

So the inverse of this function convert X to θ:

$$\theta = f^{-1}(X)$$

i.e. finding the vector of orientations from one or more end effector transforms.

To solve the IK problem, the joint transforms must be settled so that the resulting configuration of the chain places each end effector at, or as close as possible to, its target transform.

This equation is not solvable in closed form and iterative methods are used to approximate a good solution instead.

Differentiating the vector form of the FK equation to gives velocities:

$$\dot{X} = \frac{df(\theta)}{dt}$$
$$= \frac{\partial f}{\partial \theta}\frac{d\theta}{dt}$$
$$= J\dot{\theta}$$

J is the Jacobian—a matrix of partial derivatives. It tells how each bit of θ (a component of a joint rotation) makes the end effector X move.

Consider a simple 2D example with one effector:

This is to be solved for a chain of four rotation only joints. Joints rotate in the plane and as such have a single rotation value X is a 2D vector position for the effector:

$$X = \begin{bmatrix} x \\ y \end{bmatrix}$$

θ is a vector of the joint rotations:

$$\theta = \begin{bmatrix} \theta_1 \\ \theta_2 \\ \theta_3 \\ \theta_4 \end{bmatrix}$$

T is the target position for the effector:

$$T = \begin{bmatrix} tx \\ ty \end{bmatrix}$$

E is the translation required to take X to T:

$$E = T - X = \begin{bmatrix} tx - x \\ ty - y \end{bmatrix}$$

Figure 9A:
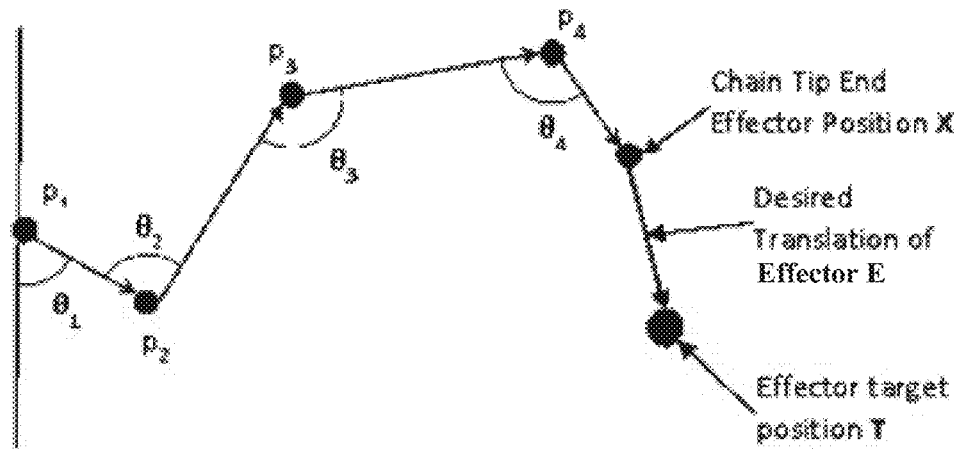
FIGS. 9a and 9c schematically illustrate the operation of a Jacobian Inverse Kinematics method for the second step illustrated in FIGS. 5e and 5f and 6e and 6f according to one embodiment.

FIG. 9a illustrates the chain.

So:

$$\begin{bmatrix} x \\ y \end{bmatrix} = \begin{bmatrix} f_1(\theta_1, \theta_2, \theta_3, \theta_4) \\ f_2(\theta_1, \theta_2, \theta_3, \theta_4) \end{bmatrix}$$

Differentiating gives:

$$\begin{bmatrix} \delta x \\ \delta y \end{bmatrix} = \begin{bmatrix} \frac{\delta f_1}{\delta \theta_1}\delta\theta_1 + \frac{\delta f_1}{\delta \theta_2}\delta\theta_2 \frac{\delta f_1}{\delta \theta_3}\delta\theta_3 + \frac{\delta f_1}{\delta \theta_4}\delta\theta_4 \\ \frac{\delta f_2}{\delta \theta_1}\delta\theta_1 + \frac{\delta f_2}{\delta \theta_2}\delta\theta_2 \frac{\delta f_2}{\delta \theta_3}\delta\theta_3 + \frac{\delta f_2}{\delta \theta_4}\delta\theta_4 \end{bmatrix}$$

Which equates to $$\begin{bmatrix} \delta x \\ \delta y \end{bmatrix} = \begin{bmatrix} \frac{\delta f_1}{\delta \theta_1} & \frac{\delta f_1}{\delta \theta_2} & \frac{\delta f_1}{\delta \theta_3} & \frac{\delta f_1}{\delta \theta_4} \\ \frac{\delta f_2}{\delta \theta_1} & \frac{\delta f_2}{\delta \theta_2} & \frac{\delta f_2}{\delta \theta_3} & \frac{\delta f_2}{\delta \theta_4} \end{bmatrix} \begin{bmatrix} \delta\theta_1 \\ \delta\theta_2 \\ \delta\theta_3 \\ \delta\theta_4 \end{bmatrix}$$

$$= \begin{bmatrix} \frac{\delta x}{\delta \theta_1} & \frac{\delta x}{\delta \theta_2} & \frac{\delta x}{\delta \theta_3} & \frac{\delta x}{\delta \theta_4} \\ \frac{\delta y}{\delta \theta_1} & \frac{\delta y}{\delta \theta_2} & \frac{\delta y}{\delta \theta_3} & \frac{\delta y}{\delta \theta_4} \end{bmatrix} \begin{bmatrix} \delta\theta_1 \\ \delta\theta_2 \\ \delta\theta_3 \\ \delta\theta_4 \end{bmatrix}$$

Or $$\dot{X} = \begin{bmatrix} \frac{\delta X}{\delta \theta_1} & \frac{\delta X}{\delta \theta_2} & \frac{\delta X}{\delta \theta_3} & \frac{\delta X}{\delta \theta_4} \end{bmatrix} \begin{bmatrix} \delta\theta_1 \\ \delta\theta_2 \\ \delta\theta_3 \\ \delta\theta_4 \end{bmatrix}$$

Or: $\dot{X} = J(\theta)\dot{\theta}$

Where J(θ) is the Jacobian matrix of this system. It is a function of θ.

$$\frac{\delta X}{\delta \theta_1}$$

can be seen as the change in X given change in $\theta_1$.

Figure 9B:
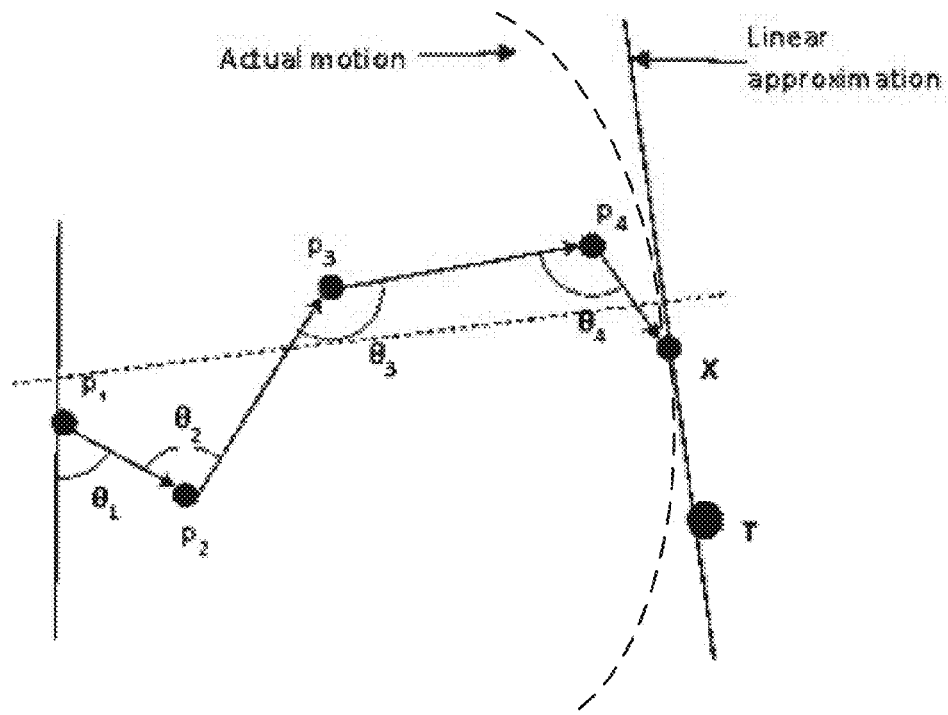

The Jacobian solutions are a linear approximation of the IK problem, they linearly model the end effectors movement relative to instantaneous system changes in joint angle. This is illustrated in FIG. 9b.

Figure 9C:
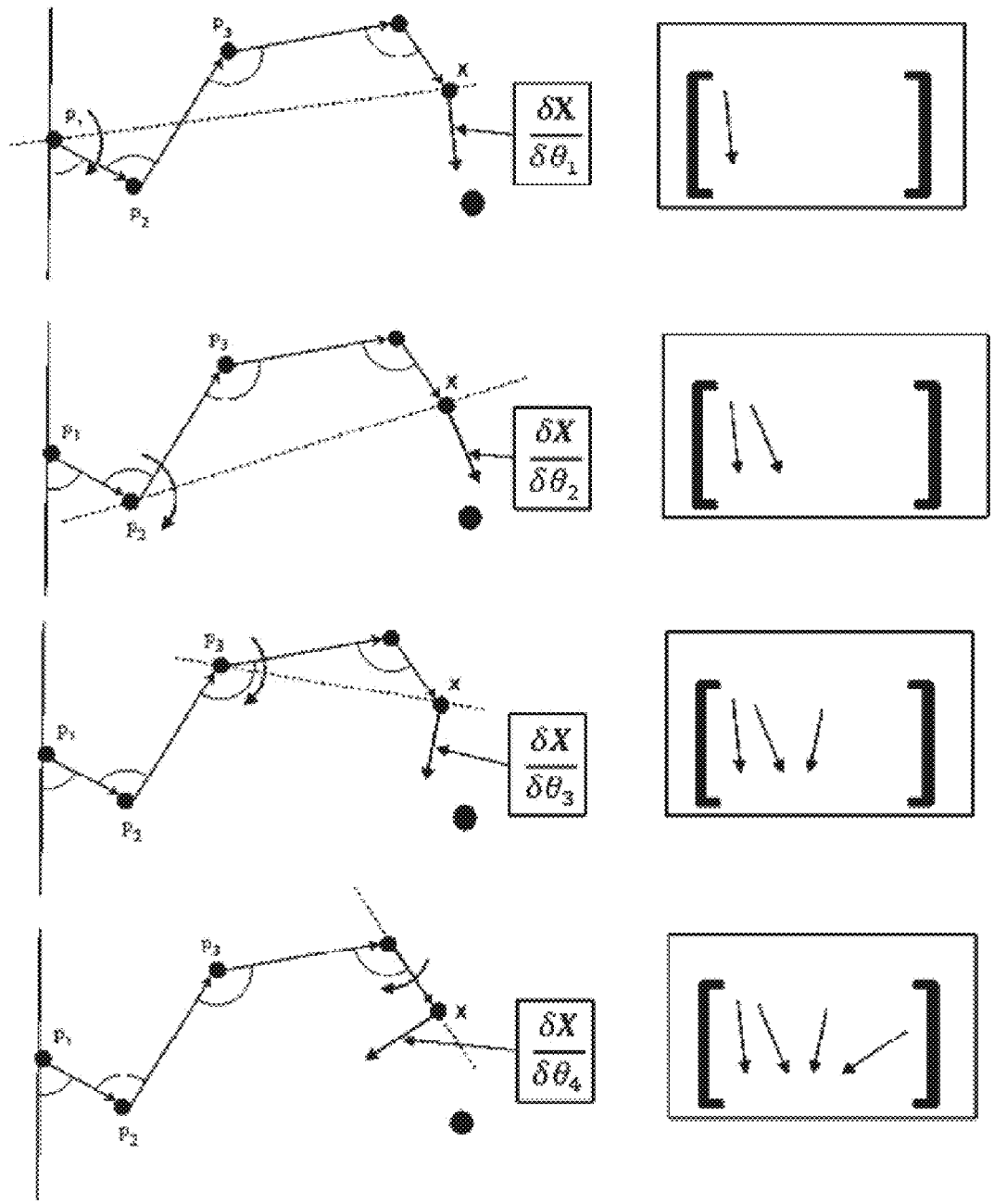

The Jacobian matrix entries for the example can be calculated as follows:

$$\frac{\delta X}{\delta \theta_1} = v_1 \times (X - p_1)$$

Where $v_1$ is a unit vector pointing along the current axis of rotation for the joint. In the illustration of FIG. 9c it is normal to the page.

With the Jabobian matrix the process can now proceed to find an update value Δθ for the purpose of incrementing the joint angles θ, so that X comes as close to T as possible.

The change in effector position X caused by this change in joint angles can be estimated as:

$$\Delta X \approx J \Delta \theta$$

The idea is that Δθ should be chosen so that ΔX is approximately equal to E. Thus the FK problem can be written as:

$$E = J \Delta \theta$$

And the IK problem can be written as:

$$\Delta\theta = J^{-1}E$$

So the task is to find $J^{-1}$. There are a number of approaches to doing this including Jacobian Pseudo-inverse, Jacobian Transpose, Singular Value Decomposition, Damped Least Squares, Pseudo-inverse Damped Least Squares etc.

Jacobian Transpose

The basic idea is very simple: use the transpose of J instead of the inverse of J. So that:

$$\Delta\theta = \alpha J^T E$$

For some appropriate scalar $\alpha$.

For reliability cc must be kept small. This results in many iterations. Also at each iteration the Jacobian must be recalculated. This then results in a trade-off between speed and accuracy.

There are also no reliability, convergence or stability guarantees which means that this method is not often used.

Jacobian Pseudo-Inverse

The Jacobian Pseudo-inverse sets $$\dot{\theta} = J^+ \dot{X}$$

This is only a solution to the velocity equation, not to the IK equation, but if a small enough step is taken it is guaranteed to be closer to the target.

In practice we are not setting velocities, but positions
So approximate:

$$\dot{X} = \frac{\Delta X}{\Delta t}, \dot{\theta} = \frac{\Delta \theta}{\Delta t}$$

$\Delta t = 1$ unit, so $$\Delta\theta = J^+ \Delta X$$

$\Delta X$ needs to be suitably chosen, as some fraction of E (the vector from the end effector to the target).

After $\Delta\theta$ is found for a single update $\Delta\theta$ can be added to $\theta$ and iterate.

FABRIK (Forward and Backward Reaching Inverse Kinematics)

This is another heuristic method for solving the IK problem. It uses the previously calculated positions of the joints to find the updates in a forward and backward iterative mode.

It updates each joint in turn working from the first joint in the chain to the last and then backwards from the last joint to the first. This process forms one iteration, it is repeated until a sufficient level of accuracy is achieved.

Figure 10:
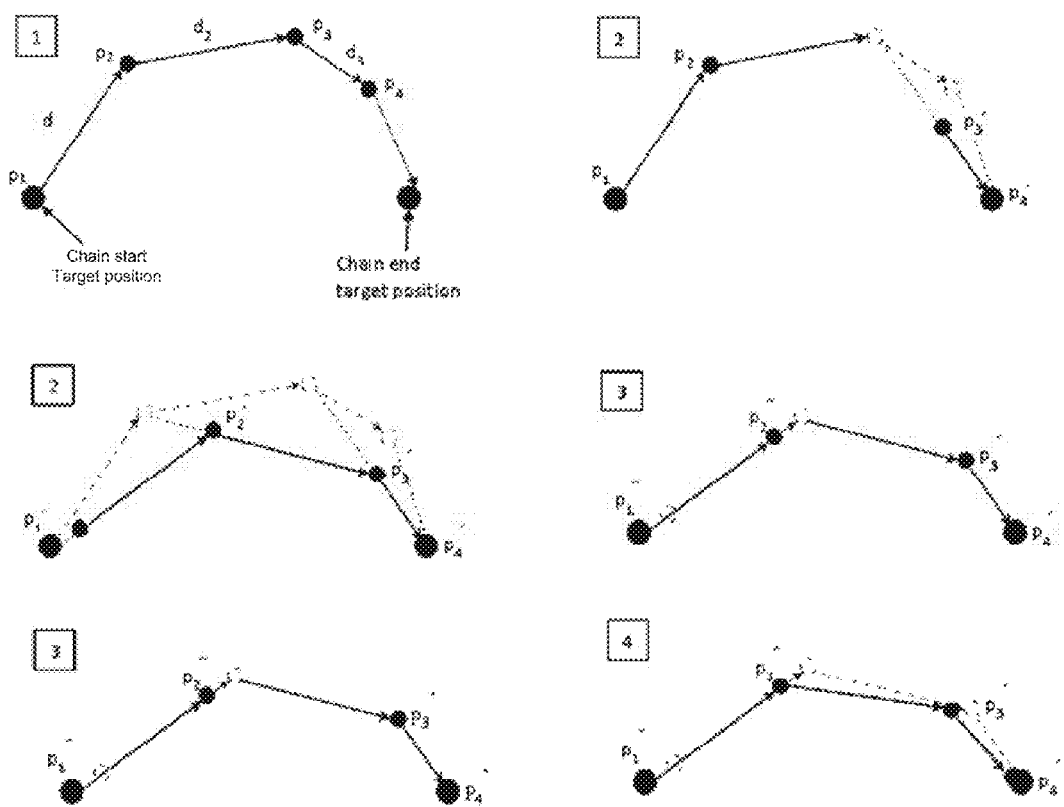
FIG. 10 schematically illustrates the operation of a FAB-RIK (Forward and Backward Reaching Inverse Kinematics method for the second step illustrated in FIGS. 5e and 5f and 6e and 6f according to one embodiment.

FIG. 10 illustrates the process.

Update Function

```
Function SolveIKChain( )
    Input: The joint positions pi for i = 1, ..., n., the target position t
and the distances between each joint di = |p_{i+1} - p_i| for i = 1, ..., n - 1.
    Output: The new joint positions p_i for i = 1, ..., n.
begin
    b = p_1
    // Check whether the distance between the end effector p_n and the
    target t is greater than a tolerance.
    diffA = |p_n - t|
    while diffA > tol do
        % STAGE 1: FORWARD REACHING
        % Set the end effector p_n as target t
        p_n = t
        for i = n - 1, ..., 1 do
            % Find the distance r_i between the new joint position p_{i+1}
            and the joint pi
            r_i = |p_{i+1} - p_i|
            λ_i = d_i/r_i
            // Find the new joint positions p_i.
            pi = (1 - λ_i) p_{i+1} + λ_i p_i
        end
        // STAGE 2: BACKWARD REACHING
        // Set the root p_1 its initial position.
        p_1 = b
        for i = 1, ..., n - 1 do
            // Find the distance r_i between the new joint position p_i
            and the joint p_{i+1}
            r_i = |p_{i+1} - p_i|
            λ_i = d_i/r_i
            // Find the new joint positions p_i.
            p_{i+1} = (1 - λ_i) p_i + λ_i p_{i+1}
        end
        diffA = |p_n - t|
    end
end
```

Extensions to These Methods

The basic methodology of a few techniques have been describe but they all have a range of well know extensions. For example:

Solving for end effector rotation as well as position.

Joint Limits that restrain joints within authored rotation limits.

Weighting systems to allow authoring control of mobility in joint degrees of freedom.

Prismatic joints as well as rotational joints.

Figure 11:
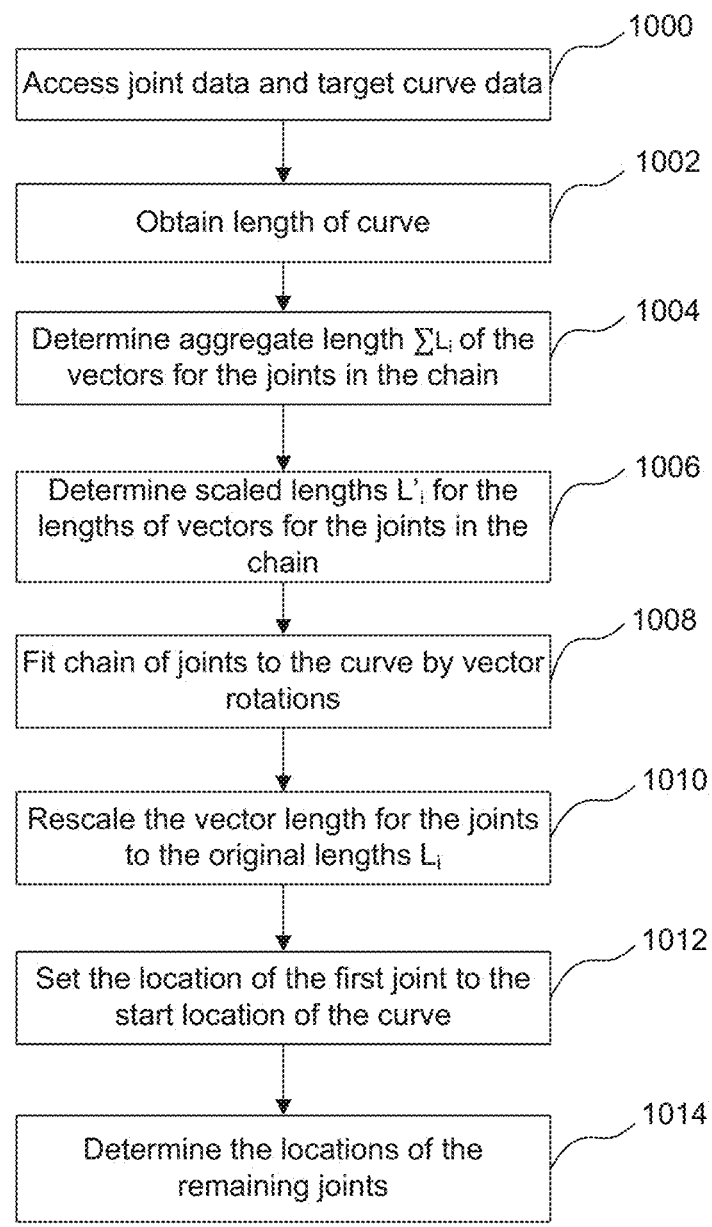
FIG. 11 is a flowchart illustrating a method for fitting joints for parts of an object to a defined curve according to one embodiment.

FIG. 11 is a flowchart illustrating a method for fitting joints for parts of an object to a defined curve according to one embodiment. The flowchart illustrates the process described above with reference to FIGS. 5 to 10.

In step 1000 joint data for a plurality of joints in a chain is accessed along with data defining a target curve. The joint data can be stored as a current configuration of a component of a rig. The curve data can be stored or generated as a result of the requirements by an animator or a control program such as a computer game. The curve data can define any curve shape that comprises a spline curve or any form of 3D parametric curve.

In step 1002 the length of the curve is obtained either by accessing this as part of the curve data if the curve data contains such length data or calculating it as an estimate. The length of the curve may not be easily calculated accurately if it is a complex 3D parametric curve and hence the curve length may only be an estimate. This is not however important since it is only used to scale the vectors for curve fitting in order to determine a set of relative angles for the scaled vectors to be used as target relative angles for the rescaled vectors. Any error in the curve length does not have a significant impact on the relative angle determination resulting from the curve fitting.

In step 1004 the aggregate length $\Sigma Li$ of the vectors for the joints in the chain is determined by summing their scalar length data values.

In step 1006 the vector lengths L0, L1 and L2 of the vectors is scaled to the length of the curve. The scaling is carried out using the equations:

$$L'i = Li(LT/\Sigma Li) \text{ for the vector index along the chain}$$
$$i = o \text{ to } n-1$$

where L'i is the length of scaled vector, Li is the original vector length, LT is the length of the curve, and $\Sigma Li$ is the sum of the vector lengths for the joints in the chain.

In step 1008, the scaled vectors are fitted to the curve by fixing the first joint to the start point of the curve and rotating the vectors to fit the curve so that the last joint lies at or near the end point of the curve.

In step 1010 the lengths of the vectors are rescaled back to their original lengths $L_i$ while the vector angles determined in the curve fitting process are retained.

In step 1012, the location of the first joint is set to the start location 302 of the curve 300 and in step 1014 the locations of the remaining joints are determined by fitting the location of the last joint to the end point 301 of the curve 300 and best fitting the intermediate joints to maintain the relative joint angles by distributing the joint rotations.

The flow diagram illustrates the operation of a computer implementing computer code for each step.

Behaviors and Inverse Kinematics

Figure 12:
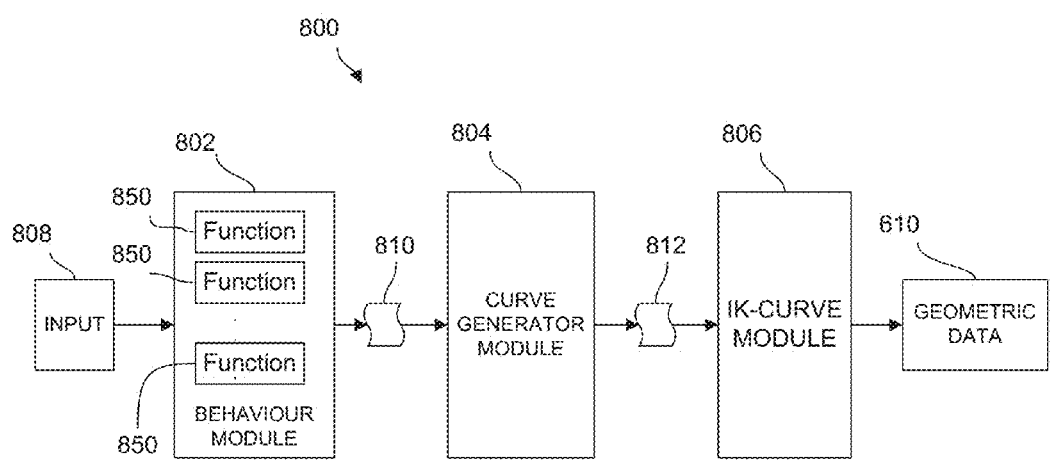
FIG. 12 schematically illustrates an example system for animating a virtual object according an embodiment.

FIG. 12 schematically illustrates an example system 800 for animating a virtual object 200, according an embodiment. The system 800 may, for example, be implemented as one or more computer programs (or one or more software modules and may, therefore, be executed by the processor 108 of the system 100 of FIG. 1.

The virtual world 202 may comprise a plurality of objects 200, and each object 200 may have its own corresponding system 800 implemented in order to animate that object 200. Alternatively, a system 800 may be used to animate a plurality of objects 200 (e.g. by sequentially or successively updating the configuration for a plurality of objects at an animation update step, or performing such updates in parallel for the plurality of objects). The description below therefore sets out how the system 800 may be used to animate a specific object 200 (with the same operations potentially being performed for other objects 200 in the virtual world 202).

The system 800 comprises a behaviour module 802, a curve generator module 804 and an IK-curve module 806. In summary, the behaviour module 802 is arranged to receive a set of one or more input parameters 808 (or data or information) and to determine, from this set of input parameters 808, behaviour data 810 for a virtual object 200. As shall become apparent, the behaviour data 810 specifies (or defines) one or more behaviour parameters that enable the curve generator module 804 to generate a curve suitable for controlling the required position of joints for parts of the object 200. The behaviour data 810 is output from the behaviour module 802 and is received (or obtained/accessed) by the curve generator module 804. The curve generator module 804 is arranged to use the behaviour data 810 to generate curve data 812—the curve data 812 specifies (or defines) a control function on which the effectors are located for the fitting of the joints to cause the joints to achieve the desired positions. The curve data 812 can be stored as part of the data in memory 106 and is output from the curve generator module 804 to be received (or obtained/accessed) by the IK-curve module 806. The IK-curve module 806 then uses the curve control function specified by the curve data 812 to perform the two-step curve IK processing as described above to determine the joint positions to define the angles for joints of the component of the object 200, i.e. to update the geometric data 610 for the component of the object 200 (as has been discussed above) using the process described with reference to FIGS. 5 to 10.

Each parameter in the set of one or more input parameters 808 may be an amount of data or a value representing a quantity intended to influence or control the behaviour (or animation or movement) of the object 200 for a next animation update step of the animation. The set of input parameters 808 may, therefore, include one or more parameters that are one or more of:

Inputs from a user (or some other controller of a game or animation tool). For example, the user inputs may identify a desired movement of the object 200, potentially including one or more properties of the movement such as a direction in which the object 200 is to move, a style in which the object 200 is to move, etc. (e.g. "move left", "crouch", "run at 70% of maximum running speed", etc.).

One or more predetermined inputs (such as default animation data for the object 200).

Data indicating how the object 200 has interacted with the virtual environment 202. This data could include, for example, an indication that a part of the object 200 has collided, or made contact, with a part of its virtual world 202 (e.g. another object within the virtual world 202), or that the object 200 is approaching another object within the virtual world 202 (with the intention then being that the object 200 should then be animated to take an evasive or protective manoeuvre).

Other data or information about the state of the object 200 and/or the virtual world 202.

The behaviour module 802 comprises, or is arranged to execute, one or more predetermined functions 850. The predetermined functions 850 may each make use of one or more of the parameters from the set of input parameters 808 to influence how the object 200 is to be animated. The behaviour module 802 uses the outputs of the predetermined functions 850 to determine behaviour data 810 for the object 200.

The predetermined functions 850 may be viewed as "abilities" or "tasks" for the object 200. For example one or more of the following may be implemented for the behaviour module 802:

One predetermined function 850 may be arranged to try to control the object 200 so as to simulate how the object 200 would respond to being "wounded" (for example when the input parameters 808 indicate that the object 200 has been wounded). This may be achieved by setting a behaviour (as specified in the behaviour data 810) for an arm so that a hand joint at the end of the arm will be moved to cover, or be located at, the wound.

Another predetermined function 850 may be arranged to control the object 200 so as to try to cause the object 200 to remain in a balanced posture, for example by setting a behaviour (as specified in the behaviour data 810) for one or more feet joints of the object 200. Such a function may make use of input parameters 808 that specify the nature of the surface on which the object 200 is positioned, together with input parameters 808 specifying other influences that may be acting on the object 200.

Another predetermined function 850 could be arranged to control the object 200 to simulate the object 200 defending itself from an attack, such as by setting a behaviour (as specified in the behaviour data 810) for an arm or leg to move joints of that arm or leg to block or repel another object in the virtual world 202.

Another predetermined function 850 could be arranged to set a behaviour (as specified in the behaviour data 810) for a head of the object 200 to control a joint for the head so that the head remains oriented and facing towards a particular point or object within the virtual world 202.

Another predetermined function 850 could be to control the object 200 to simulate the character walking, running, or performing some other predetermined movement, by setting one or more behaviors (as specified in the behaviour data 810) for corresponding parts of the object 200.

Another predetermined function 850 could be to control the object 200 to perform a predetermined interaction with another object in the virtual world 202 (such as pressing a button or picking up an object), by setting one or more behaviors (as specified in the behaviour data 810) for corresponding parts of the object 200.

Another predetermined function 850 could be to control the object 200 to collide with another object in the virtual world 202 in a particular manner, by setting one or more behaviors (as specified in the behaviour data 810) for corresponding parts of the object 200, such as by specifying a target location and a target velocity for the collision for one or more parts of the object 200.

Other abilities may, of course, be provided for by other predetermined functions 850. Indeed, the behaviour module 802 may be arranged to receive, as an input, animation data for (or defining) a predetermined animation (e.g. a "walk" animation or a "run" animation), and the behaviour module 802, or one of its predetermined functions 850, may be arranged to pass this animation (in the form of behaviour data 810) to the curve generator module 804.

Some of the predetermined functions 850 may be specific to a subset of joints or bones of the object 200, thereby outputting behaviour data just in relation to those specific joints or bones; other predetermined functions 850 may determine behaviour data for the whole object 200.

At any given animation update step, a predetermined function 850 may generate new behaviour data to specify one or more behaviors for the object 200, or may not generate new behaviour data. For example, if a predetermined function 850 is arranged to try to control the object 200 so as to simulate how the object 200 would respond to being "wounded" (for example when the input parameters 808 indicate that the object 200 has been wounded), then that predetermined function 850 may generate and output new behaviour data if the input parameters 808 change to indicate that the object 200 has been wounded, whereas it might not generate and output new behaviour data if the input parameters do not change to indicate that the object 200 has been wounded. Thus, at any given animation update step, the behaviour module 802 may generate new behaviour data 810 to specify one or more behaviors for the object 200, or may not generate new behaviour data 810.

By making use of individual predetermined functions 850, the behaviour module 802 is made modular, which makes it easier to add and extend different aspects of character behaviour. For example, if a new ability for the object 200 is to be implemented, such as an ability to point a hand (at the end of an arm limb) at a location or object within the virtual world 202, then a new predetermined function 850 for that ability may be created (in isolation) and added to the behaviour module 802 without affecting the already-existing predetermined functions 850. It will be appreciated, however, that the behaviour module 802 may be implemented itself as a single predetermined function 850 (albeit perhaps more complex and involved than the more modular approach set out above).

The behaviour module 802 takes the outputs from each predetermined function 850 and generates, or determines, the behaviour data 810 for the object 200. Some of the predetermined functions 850 may each wish to control how a particular joint or bone is to be controlled or moved. For example, if the set of input parameters 808 indicates that the object 200 has received a wound and is also being attacked, then one of the predetermined functions 850 that responds to the object 200 being "wounded" may wish to move a hand joint to cover the wound, whilst another one of the predetermined functions 850 that responds to the object 200 being "attacked" may wish to move that same hand joint so as to defend the object 200 from the attack. The behaviour module 802 may arbitrate between the outputs of multiple predetermined functions 850 in order to generate the output behaviour data 810. This arbitration can be achieved in any suitable way, such as: by forming the behaviour data 810 using a weighted combination of the individual configurations/targets output by each of the predetermined functions 850; by ignoring individual configurations/targets output by some of the predetermined functions 850 (in preference of individual configurations/targets output by other predetermined functions 850) in certain circumstances; etc.

Hence, the output from the behaviour module 802 comprises behaviour data 810 for the object 200. The behaviour data 810 may take many different forms. In general, though, the behaviour data 810 specifies, or defines, for one or more object parts (e.g. joints) of the object 200, a corresponding behaviour. Thus, the behaviour data 810 may comprise one or more behaviour parameters that define or specify that behaviour.

Figure 13:
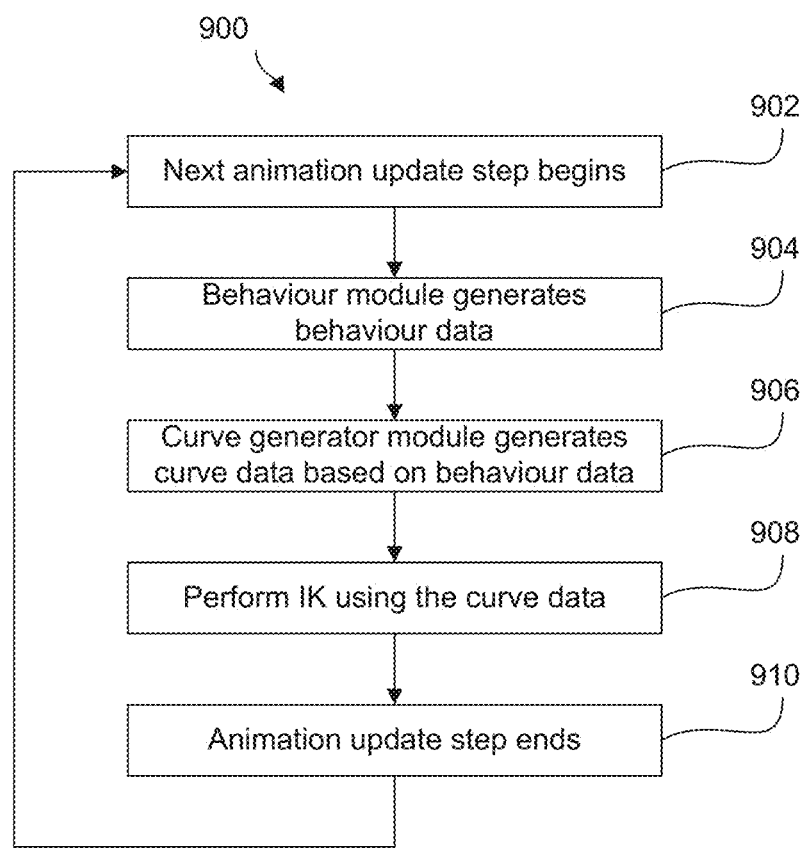
FIG. 13 is a flowchart illustrating a method for animating an object using the system of FIG. 12 according to an embodiment.

FIG. 13 is a flowchart illustrating a method 900 for animating an object 200 using the system 800 of FIG. 13 according to an embodiment.

At a step 902, a next animation update step (in the sequence/series of animation update steps) begins. This "next" animation update step is then the "current" animation update step.

At an optional step 904, the behaviour module 802 generates and outputs (or updates) the behaviour data 810. For example, the behaviour module 802 may be arranged to generate (or determine) and output the behaviour data 810 at each animation update step based on the current set of input parameters 808. However, this step 904 is optional because the behaviour module 802 may be arranged to generate and output (or update) the behaviour data 810 at an animation update step only if there has been a change to the set of input parameters 808 since the preceding animation update step (in which case, the behaviour module 802 may be arranged to detect or determine whether there has been a change to the set of input parameters 808 for the current animation update step relative to the immediately preceding animation update step).

The actual generation of the behaviour data 810 based on input parameters 808 that the behaviour module 802 receives (or accesses/obtains) has been described above.

The behaviour module 802 may store the behaviour data 810, for example as part of the data 620 for the object 200—thus, if the behaviour module 802 generates new behaviour data 810 at the current animation update step, then that new behaviour data 810 is available as part of the data 620, whereas if the behaviour module 802 does not generate new behaviour data 810 at the current animation update step, then previously generated behaviour data 810 is available as part of the data 620. Additionally, or alternatively, the behaviour module 802 may provide the behaviour data 810 to the curve generator module 804 (either at each animation update step, regardless of whether new behaviour data 810 has been generated at the current animation update step, or only at an animation update step at which new behaviour data 810 has been generated).

At a step 906, the curve generator module 804 receives or obtains/accesses) the behaviour data 810. As set out above, the curve generator module 804 may receive the behaviour data 810 directly from the behaviour module 802 (potentially at each animation update step or only at an animation update step at which new behaviour data 810 has been generated by the behaviour module 802). Alternatively, the curve generator module 804 may access stored behaviour data 810 (e.g. from the data 620).

As mentioned above, the behaviour data 810 specifies (or defines), for one or more object parts of the object 200, a corresponding behaviour. At the step 906, for each of these one or more object parts for which a behaviour has been defined, the curve generator module 804 generates a curve defining a control function based on the behaviour data.

Thus, the curve generator module 804 generates the curve data 812 at the step 906. The curve generator module 804 may store the curve data 812, for example as part of the data 620 for the object 200. Additionally, or alternatively, the curve generator module 804 may provide the curve data 812 to the IK-curve module 806.

At a step 908, the IK-curve module 806 receives (or obtains/accesses) the curve data 812. As set out above, the IK-curve module 806 may receive the curve data. 812 directly from the curve generator module 804. Alternatively, the IK-curve module 806 may access stored curve data 812 (e.g. from the data 620).

At the step 908, the IK-curve module 806 performs a curve IK operation, based on the curve data determined for each of the one of more object parts for which the behaviour data 810 specified a behaviour. The IK-curve module 806 uses the curve control function specified by the curve data 812 to perform IK curve processing to determine the effector positions and hence the locations and angles for joints of the component of the object 200, i.e. to update the geometric data 610 for the object 200 (as has been discussed above) using the two step process described with reference to FIG. 5 to FIG. 11. This curve IK operation updates a configuration for the effectors associated with the object parts of the object 200 and updates the position and orientation of the object parts, i.e. the curve IK operation updates the geometric data 610 for the object 200.

At a step 910, the current animation update step ends. This may involve, for example, rendering an image representing the updated configuration of the object 200 (e.g. to depict the animation of the object 200 on the screen 120) and/or saving (or storing) data indicative of the update to the geometric data 610 for the object 200 (so that an animation of the object 200 can be rendered at a later point in time based on this stored data). Other processing may be performed (e.g. to update other data 622 for a game involving the object 200, the update being based on the updated configuration for the object 200, such as scoring game points or losing game lives or proceeding to a next stage in the game, etc.).

Processing may then return to the step 902 in order to perform a further animation update step in the sequence of animation update steps.

Thus, the system 800 will determine, for one or more object parts of the object 200, a corresponding behaviour and, at each animation update step of a sequence of one or more animation update steps: for each of the one or more object parts, perform a curve generation for that object part; and perform a curve inverse kinematics operation to determine the updated effectors for each of the object parts, to update a configuration for the plurality of object parts of the object 200. These one or more animation update steps are animation update steps that (a) include the animation update step at which behaviour(s) is/are determined and behaviour data 810 specifying the determined behaviors is generated and (b) zero or more subsequent animation update steps. Once new behaviour data 810 is generated by the behavior module 802, then the behaviors specified by that new behaviour data 810 may relate to some or all of the same object parts as the previous target data 810 (in which case the behaviors specified by the new behaviour data 810 for these object parts may or may not be the same as the behaviors specified by the previous behaviour data 810 for these object parts) and/or may relate to different object parts from those for the previous target data 810, and the curve generator module 804 will perform its curve generation based, at least in part, on the behaviors specified by the new behaviour data 810.

Curve Types

In the illustrated in FIGS. 5 to 10, a simple curve function has been described. Embodiments of the invention are however applicable to any parametric curve, including complex curves.

Figure 14:
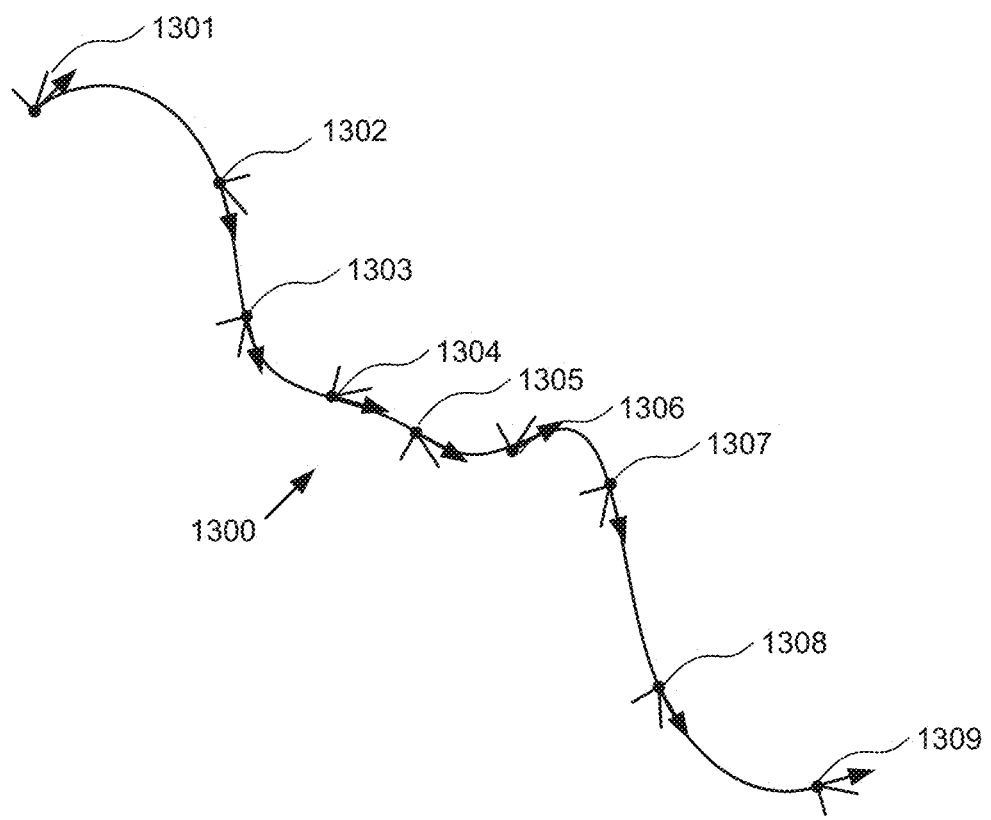
FIG. 14 schematically illustrates a more complex target curve used to define the target locations according to an alternative embodiment.

FIG. 14 illustrates a complex curve of an embodiment, in which the curve 1300 is formed from concatenated curve functions indicated by sequential control start points 1301, 1302, 1303, 1304, 1305, 1306, 1307, 1308 and 1309 (the end control point). Intermediate control points (not shown) can also be defined for each curve. The control points can define a rotation or twisting of the function to be applied along the length between control points.

In an alternative embodiment, the curve illustrated in FIG. 14 comprises a single curve function having nine control points illustrated as points 1301, 1302, 1303, 1304, 1305, 1306, 1307, 1308 and 1309 in FIG. 14.

In order to meet the animation requirements of an animator or a program such as a game program, the curve can be acted upon either by acting on the parameters for control points to define a new instantiation of a curve object type or by acting to redefine the curve type.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A computer implemented method for animating parts of a virtual object in a virtual world, the method comprising:
  accessing joint data for each joint of a chain of joints associated with parts of a virtual object, joint data including length data defining a vector length for a vector from the joint to a next joint, the length data corresponding to a length of a part in the virtual world;
  accessing data for a target curve for use in defining possible target locations for the joints of the parts of the virtual object, and retrieving or estimating a length of the curve;
  in an automated procedure performed using one or more computer processors configured therefor, processing the joint data to:
    determine a total length of the vectors for the joints of the chain using the length data for the vectors;
    determine scaled vectors by determining a scaled length for the vector for each joint of the chain based on the length of the curve and the total length of the vectors for the joints of the chain;
    fit the scaled vectors for the joints of the chain to the curve by rotating the scaled vectors, with a first joint in the chain fitted to a start point on the curve and the last joint in the chain fitted to an end point on the curve;

rescale the scaled vector for each joint of the chain to have the vector length:

set the first joint in the chain to the start point on the curve; and determine locations for the joints by rotating the vectors to fit the last joint in the chain to the end point of the curve and to determine the locations of intermediate joints by distributing vector rotations for the intermediate joints among the vectors; and applying the determined locations for the joints to the virtual object in a representation of part of the virtual world on a display device, thereby producing an animated display of the virtual object in the virtual world.

2. A method according to claim 1, wherein the scaled vectors have relative angles there between, and the locations of the intermediate joints are determined by rotating the vectors so that the relative angles there between substantially match the relative angles for the scaled vectors.

3. A method according to claim 1, wherein the locations of the intermediate joints are determined by rotating the vectors to minimize the change in the angle of each vector relative to the angle of each respective scaled vector.

4. A method according to claim 1, wherein a distance between the start point and the end point on the curve is less than the total length of the vectors for the joints of the chain.

5. A method according to claim 1, wherein the curve comprises a parametric curve or a spline curve.

6. A method according to claim 1, wherein the locations for the joints are determined using inverse kinematics.

7. A method according to claim 1, wherein each scaled vector is determined by multiplying the length of a corresponding vector by the ratio of the curve length and the determined total length of the vectors for the joints of the chain.

8. A computer system for animating parts of a virtual object in a virtual world, the computer system comprising:

a program memory storing program code; and a processor for implementing the program code stored in the program memory;

wherein the program code comprises:

code for controlling the processor to access joint data for each joint of a chain of joints associated with parts of a virtual object, joint data including length data defining a vector length for a vector from the joint to a next joint, the length data corresponding to a length of a part in the virtual world;

code for controlling the processor to access data for a target curve for use in defining possible target locations for the joints of the parts of the virtual object and to retrieve or estimate a length of the curve;

code for controlling the processor to process the joint data to:

determine a total length of the vectors for the joints of the chain using the length data for the vectors;

determine scaled vectors by determining a scaled length for the vector for each joint of the chain based on the length of the curve and the total length of the vectors for the joints of the chain;

fit the scaled vectors for the joints of the chain to the curve by rotating the scaled vectors, with a first joint in the chain fitted to a start point on the curve and the last joint in the chain fitted to an end point on the curve;

rescale the scaled vector for each joint of the chain to have the vector length;

set the first joint in the chain to the start point on the curve; and determine locations for the joints by rotating the vectors to fit the last joint in the chain to the end point of the curve and to determine the locations of intermediate joints by distributing vector rotations for the intermediate joints among the vectors; and code for controlling the processor to apply the determined locations for the joints to the virtual object in a representation of part of the virtual world on a display device, thereby to produce an animated display of the virtual object in the virtual world.

9. A computer system according to claim 8, wherein the scaled vectors have relative angles there between, and the code for controlling the processor to determine the locations of the intermediate joints comprises code for controlling the processor to rotate the vectors so that the relative angles there between substantially match the relative angles for the scaled vectors.

10. A computer system according to claim 8, wherein the code for controlling the processor to determine the locations of the intermediate joints comprises code for controlling the processor to rotate the vectors to minimize the change in the angle of each vector relative to the angle of each respective scaled vector.

11. A computer system according to claim 8, wherein a distance between the start point and the end point on the curve is less than the total length of the vectors for the joints of the chain.

12. A computer system according to claim 8, wherein the curve comprises a parametric curve or a spline curve.

13. A computer system according to claim 8, wherein the code for controlling the processor to determine the locations of the intermediate joints comprises code for controlling the processor to determine the locations of the intermediate joints using inverse kinematics.

14. A computer system according to claim 8, wherein the code for controlling the processor to determine each scaled vector comprises code for controlling the processor to multiply the length of a corresponding vector by the ratio of the curve length and the determined total length of the vectors for the joints of the chain.

15. A non-transient storage medium storing computer code for controlling a computer to:

access joint data for each joint of a chain of joints associated with parts of a virtual object, joint data including length data defining a vector length for a vector from the joint to a next joint, the length data corresponding to a length of a part in the virtual world;

access data for a target curve for use in defining possible target locations for the joints of the parts of the virtual object and for retrieving or estimating a length of the curve;

process the joint data to:

determine a total length of the vectors for the joints of the chain using the length data for the vectors;

determine scaled vectors by determining a scaled length for the vector for each joint of the chain based on the length of the curve and the total length of the vectors for the joints of the chain;

fit the scaled vectors for the joints of the chain to the curve by rotating the scaled vectors, with a first joint in the chain fitted to a start point on the curve and the last joint in the chain fitted to an end point on the curve;

rescale the scaled vector for each joint of the chain to have the vector length;

set the first joint in the chain to the start point on the curve; and determine locations for the joints by rotating the vectors to fit the last joint in the chain to the end point of the curve and to determine the locations of intermediate joints by distributing vector rotations for the intermediate joints among the vectors; and apply the determined locations for the joints to the virtual object in a representation of art of the virtual world on a display device, thereby producing an animated display of the virtual object in the virtual world.

16. A non-transient storage medium according to claim 15, wherein the scaled vectors have relative angles there between, and the processing of the joint data determines the locations of the intermediate joints by rotating the vectors so that the relative angles there between substantially match the relative angles for the scaled vectors.

17. A non-transient storage medium according to claim 15, wherein the processing of the joint data determines the locations of the intermediate joints by rotating the vectors to minimize the change in the angle of each vector relative to the angle of each respective scaled vector.

18. A non-transient storage medium according to claim 15, wherein a distance between the start point and the end point on the curve is less than the total length of the vectors for the joints of the chain.

19. A non-transient storage medium according to claim 15, wherein the curve comprises a parametric curve or a spline curve.

20. A non-transient storage medium according to claim 15, wherein the processing of the joint data determines the locations for the joints using inverse kinematics.

21. A non-transient storage medium according to claim 15, wherein the processing of the joint data determines each scaled vector by multiplying the length of a corresponding vector by the ratio of the curve length and the determined the total length of the vectors for the joints of the chain.

* * * * *

UNITED STATES PATENT AND TRADEMARK OFFICE
CERTIFICATE OF CORRECTION

| | |
|---|---|
| PATENT NO. | : 10,297,066 B2 |
| APPLICATION NO. | : 15/802223 |
| DATED | : May 21, 2019 |
| INVENTOR(S) | : James Edward John Brewster |

It is certified that error appears in the above-identified patent and that said Letters Patent is hereby corrected as shown below:

In the Specification

In Column 1, Line 34, delete "(h)" and insert --(b)-- therefor

In Column 4, Line 39, delete "or" and insert --(or-- therefor

In Column 6, Line 13, after "frequency", insert --(i.e.--

In Column 8, Line 15, delete "308" and insert --610-- therefor

In Column 10, Line 63, delete "resealed" and insert --rescaled-- therefor

In Column 10, Line 66, delete "resealed" and insert --rescaled-- therefor

In Column 12, Line 2, delete "resealed" and insert --rescaled-- therefor

In Column 12, Line 5, delete "resealed" and insert --rescaled-- therefor

In Column 17, Line 14, delete "cc" and insert --α-- therefor

In Column 18, Line 23, delete "describe" and insert --described,-- therefor

In Column 18, Line 53, delete "resealed" and insert --rescaled-- therefor

In Column 19, Line 5, delete "resealed" and insert --rescaled-- therefor

Signed and Sealed this
Fourteenth Day of April, 2020

Andrei Iancu
*Director of the United States Patent and Trademark Office*

CERTIFICATE OF CORRECTION (continued)
U.S. Pat. No. 10,297,066 B2

In the Claims

In Column 25, Line 5, in Claim 1, delete "length:" and insert --length;-- therefor In Column 27, Line 14, in Claim 15, delete "art" and insert --part-- therefor